US010703825B2

(12) United States Patent
Ukita et al.

(10) Patent No.: US 10,703,825 B2
(45) Date of Patent: *Jul. 7, 2020

(54) CELLULOSE ACETATE WITH A LOW DEGREE OF SUBSTITUTION

(71) Applicant: DAICEL CORPORATION, Osaka-shi, Osaka (JP)

(72) Inventors: Shizuka Ukita, Himeji (JP); Hiroki Taniguchi, Himeji (JP); Shu Shimamoto, Tokyo (JP); Toshikazu Nakamura, Himeji (JP)

(73) Assignee: DAICEL CORPORATION, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/775,369

(22) PCT Filed: Mar. 12, 2014

(86) PCT No.: PCT/JP2014/056474
§ 371 (c)(1),
(2) Date: Sep. 11, 2015

(87) PCT Pub. No.: WO2014/142166
PCT Pub. Date: Sep. 18, 2014

(65) Prior Publication Data
US 2016/0032020 A1 Feb. 4, 2016

(30) Foreign Application Priority Data

Mar. 13, 2013 (JP) .................. 2013-050915
Oct. 2, 2013 (JP) ................. 2013-206955
Dec. 20, 2013 (JP) ................. 2013-263889

(51) Int. Cl.
C08B 3/06 (2006.01)
C08B 3/24 (2006.01)
D01F 2/28 (2006.01)
C08L 1/12 (2006.01)
C08L 1/14 (2006.01)
C08J 5/18 (2006.01)
C08B 3/28 (2006.01)

(52) U.S. Cl.
CPC .................. *C08B 3/06* (2013.01); *C08B 3/24* (2013.01); *C08B 3/28* (2013.01); *C08J 5/18* (2013.01); *C08L 1/12* (2013.01); *C08L 1/14* (2013.01); *D01F 2/28* (2013.01); *C08J 2301/12* (2013.01)

(58) Field of Classification Search
CPC .... C08B 3/06; C08B 3/24; C08B 3/28; C08L 1/12; D01F 2/28
USPC .......................................... 536/69, 76, 124
See application file for complete search history.

(56) References Cited

U.S. PATENT DOCUMENTS

| 3,767,642 | A | 10/1973 | Campbell et al. |
| 4,888,420 | A | 12/1989 | Steiner et al. |
| 5,142,034 | A | 8/1992 | Bellas et al. |
| 5,549,861 | A * | 8/1996 | Huber ............. C08B 16/00 264/187 |
| 5,597,912 | A | 1/1997 | Edgar et al. |
| 5,914,397 | A | 6/1999 | Kiyose et al. |
| 9,498,431 | B2 | 11/2016 | Xu et al. |
| 10,188,675 | B2 | 1/2019 | Shimamoto et al. |
| 10,300,085 | B2 * | 5/2019 | Shimamoto ........... A23L 33/24 |
| 10,335,370 | B2 | 7/2019 | Xu et al. |
| 2002/0098112 | A1 | 7/2002 | Hayashi |
| 2002/0183764 | A1 | 12/2002 | Kinugasa et al. |
| 2004/0024198 | A1 | 2/2004 | Shibata et al. |
| 2006/0240108 | A1 | 10/2006 | Bernard |
| 2008/0176819 | A1 | 7/2008 | Lynch et al. |
| 2008/0194807 | A1 | 8/2008 | Buchanan et al. |
| 2009/0062525 | A1 | 3/2009 | Shibata et al. |

(Continued)

FOREIGN PATENT DOCUMENTS

CN 102281870 A 12/2001
CN 101166518 A 4/2008

(Continued)

OTHER PUBLICATIONS

Lee et al., Carbohydrate Polymers, 2003, 54, p. 353-362. (Year: 2003).*
Notification of Reason for Refusal—drafted on Nov. 10, 2015 and dated Nov. 17, 2015, issued in JP 2015-505511.
International Search Report dated Apr. 28, 2014, in PCT International Application No. PCT/JP2014/056474.
Extended European Search Report for European Application No. 14763960.3, dated Jul. 19, 2016.

(Continued)

*Primary Examiner* — Jonathan S Lau
(74) *Attorney, Agent, or Firm* — Birch, Stewart, Kolasch & Birch, LLP

(57) ABSTRACT

A cellulose acetate according to the present invention has a total degree of acetyl substitution of 0.4 to 1.1 and has a compositional distribution index (CDI) of 3.0 or less, where the CDI is specified by the formula:

CDI=(Measured value of half height width of chemical composition)/(Theoretical value of half height width of chemical composition)

where the measured value of half height width of chemical composition is a half height width of chemical composition determined by analyzing a cellulose acetate propionate by HPLC, where the cellulose acetate propionate is prepared by propionylating all residual hydroxy groups of the cellulose acetate (sample); and Theoretical value of half height width of chemical composition=2·35482
$\sqrt{3 \cdot DPw \cdot (DS/3) \cdot (1-DS/3)}/DPw$ [Math. 1]

where DS is the total degree of acetyl substitution; and DPw is a weight-average degree of polymerization determined by a GPC-light scattering method using a cellulose acetate propionate prepared by propionylating all residual hydroxy groups of the cellulose acetate (sample).

10 Claims, 4 Drawing Sheets

(56) References Cited

U.S. PATENT DOCUMENTS

| | | |
|---|---|---|
| 2009/0093441 A1 | 4/2009 | Lynch et al. |
| 2009/0171079 A1 | 7/2009 | Higuchi |
| 2010/0074951 A1 | 3/2010 | Kim et al. |
| 2011/0166340 A1 | 7/2011 | Shibata et al. |
| 2011/0244043 A1 | 10/2011 | Xu et al. |
| 2016/0032020 A1 | 2/2016 | Ukita et al. |
| 2016/0317568 A1 | 11/2016 | Shimamoto et al. |
| 2017/0035695 A1 | 2/2017 | Xu et al. |

FOREIGN PATENT DOCUMENTS

| | | | |
|---|---|---|---|
| EP | 0822201 A2 | 2/1998 | |
| EP | 1 205 183 A2 | 5/2002 | |
| EP | 2075261 A1 | 7/2009 | |
| EP | 2472296 A1 * | 7/2012 | ............... C08B 3/06 |
| JP | 48-17580 | 3/1973 | |
| JP | 56-59801 A | 5/1981 | |
| JP | 58-34801 A | 3/1983 | |
| JP | 62-7701 A | 1/1987 | |
| JP | 4-261401 A | 9/1992 | |
| JP | 5-500684 A | 2/1993 | |
| JP | 5-501129 A | 3/1993 | |
| JP | 9-77801 A | 3/1997 | |
| JP | 2883911 B2 | 4/1999 | |
| JP | 2003-201301 A | 7/2003 | |
| JP | 3749746 B2 | 3/2006 | |
| JP | 2009-155555 A | 7/2009 | |
| JP | 2010-508267 A | 3/2010 | |
| JP | 2010-100583 A | 5/2010 | |
| JP | 5921762 B2 | 5/2016 | |
| WO | WO 91/16358 A1 | 10/1991 | |
| WO | WO 02/30485 A1 | 4/2002 | |
| WO | WO 02/072638 A1 | 9/2002 | |
| WO | WO 2005/054297 A2 | 6/2005 | |
| WO | WO 2012/163836 A1 | 12/2012 | |
| WO | WO 2015/093067 A1 | 6/2015 | |

OTHER PUBLICATIONS

Japanese Notification of Reasons for Refusal for Japanese Application No. 2016-079434, dated Jun. 20, 2017, with a machine translation.

Wheatley, T.A., et al, "Water Soluble Cellulose Acetate: A Versatile Polymer for Film Coating," Drug Development and Industrial Pharmacy, Jan. 2007, vol. 33. No. 3, pp. 251-290.

European Search Report for Appl. No. 15770345.5 dated Nov. 7, 2017.

Extended European Search Report for European Application No. 14873093.0, dated Jul. 28, 2017.

Office Action dated Jun. 26, 2019, in Chinese Patent Application No. 210480069816.8.

Zhang et al., "Effects of the type of fiber in nitrogen-free diets and food intake on endogenous amino acid measurements in pig," Acta Veterinaria et Zootechnica Sinca (1999), vol. 30, No. 4, pp. 1-9.

Atarashi et al., "Induction of Colonic Regulatory T Cells by Indigenous *Clostridium* Species," Science (Jan. 21, 2011), vol. 331, pp. 337-341, with Supporting Material.

International Search Report dated Apr. 28, 2015, in PCT/JP2015/058579.

International Search Report dated Jun. 17, 2014, in PCT/JP2014/058069.

Kishimoto et al., "Effects of Long-term Administration of Indigestible Dextrin on Visceral Fat Accumulation," J. Jpn. Assoc. Dietary Fiber Res. (2000), vol. 4, No. 2, pp. 59-65.

Office Action dated Mar. 21, 2017, in JP 2015-503703.

Thomas et al., "Subchronic Oral Toxicity of Cellulose Acetate in Rats," Fd. Chem. Toxic. (1991), vol. 29, No. 7, pp. 453-458.

U.S. Appl. No. 16/258,224, filed Jan. 25, 2019.

U.S. Office Action for U.S. Appl. No. 15/128,682 dated Sep. 10, 2018.

"Glossary of Medical Education Terms," Institute of International Medical Education, http://www.iime.org/glossary.htm, Accessed in Mar. 2013.

Anderson, J.W., et al, "Health benefits of dietary fiber," Nutrition Reviews, 2009, vol. 67, No. 4, pp. 188-205.

Ferguson, M.J., et al, "Production of short-chain fatty acids following in vitro fermentation of saccharides, saccharide esters, fructo-oligosaccharides, starches, modified starches and non-starch polysaccharides," J. Sci. Food. Agric., 2000, vol. 80, pp. 166-170.

U.S. Office Action for U.S. Appl. No. 15/106,095 dated Feb. 22, 2018.

U.S. Office Action for U.S. Appl. No. 15/128,682 dated Feb. 22, 2018.

Machine English translation of JP 4-261401 A (Sep. 17, 1992).

* cited by examiner

[Fig. 1]
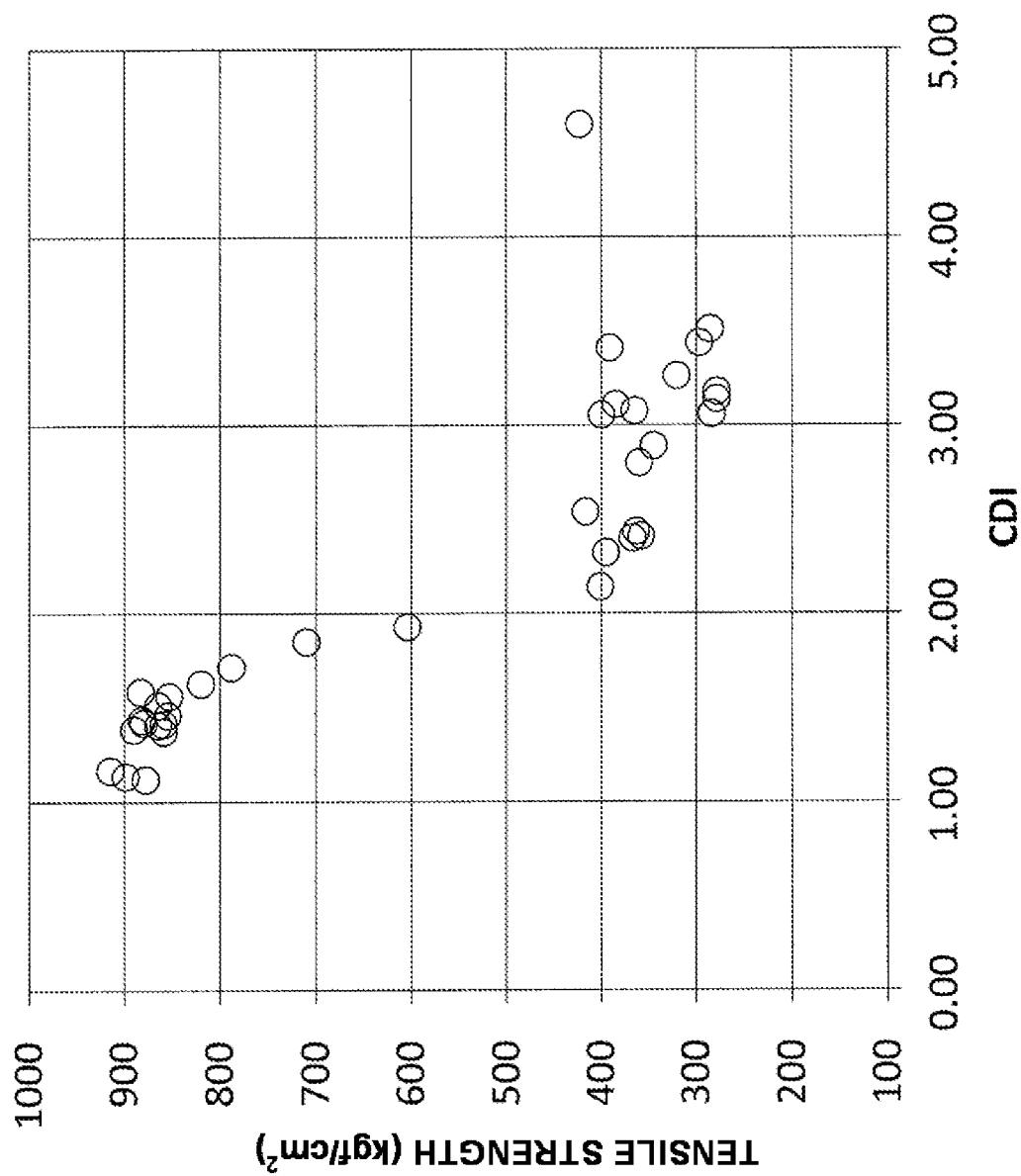

[Fig. 2]
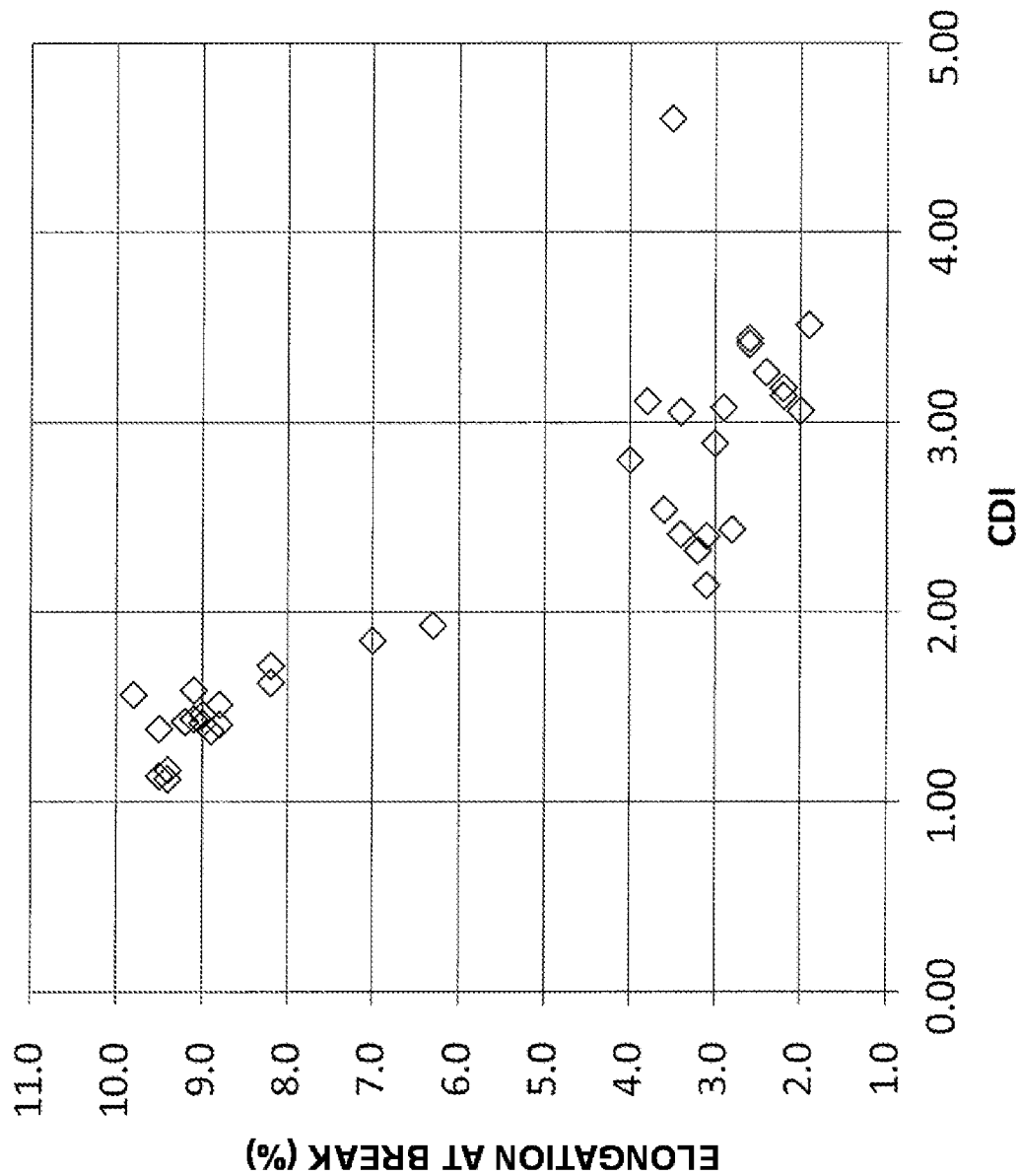

[Fig. 3]
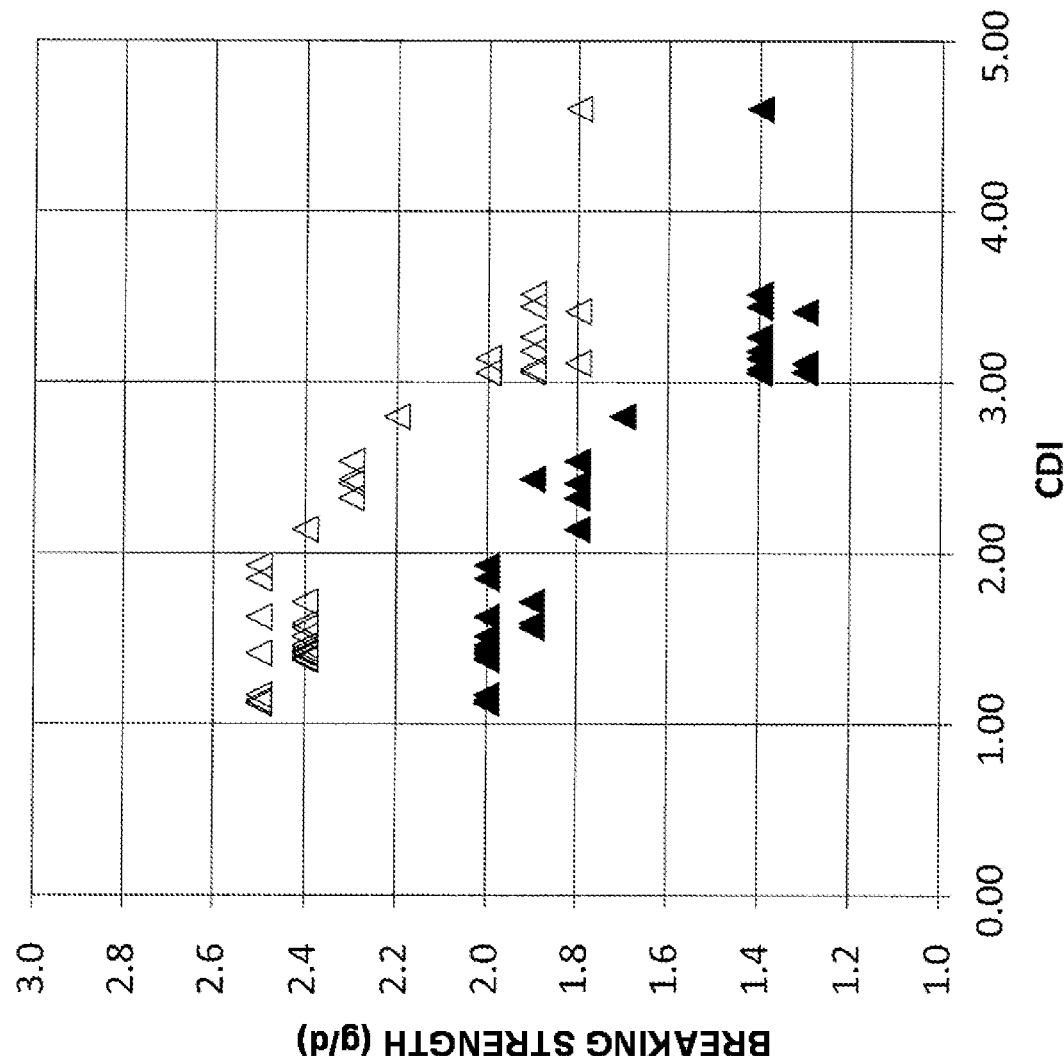

[Fig. 4]
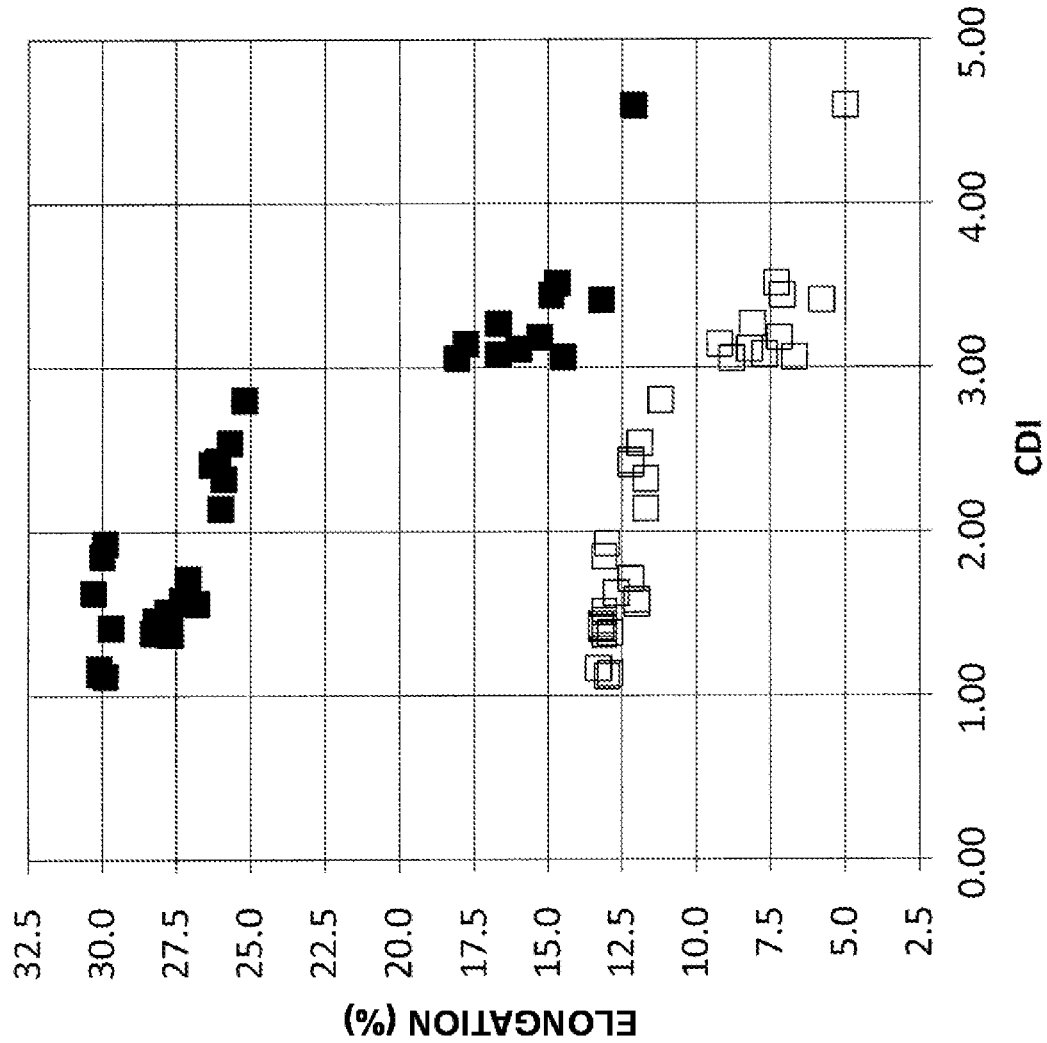

CELLULOSE ACETATE WITH A LOW DEGREE OF SUBSTITUTION

The present application claims priority to Japanese Patent Application No. 2013-050915 filed in Japan on Mar. 13, 2013, Japanese Patent Application No. 2013-206955 filed in Japan on Oct. 2, 2013, and Japanese Patent Application No. 2013-263889 filed in Japan on Dec. 20, 2013, the entire contents of which are incorporated herein by reference.

TECHNICAL FIELD

The present invention relates to a cellulose acetate with a low degree of substitution that can give formed articles, such as films and fibers, having strength/elongation at high levels. The cellulose acetate as above is highly soluble in water and may be used as a water-soluble polymeric material typically for or in tablet binders, tablet coating agents, binders of staple fiber, cosmetic thickeners, cosmetic moisturizers, excipients or fillers, and materials for formed articles.

BACKGROUND ART

Known water-soluble cellulose derivatives include hydroxypropyl cellulose which is used for binders and coating agents of tablets. Independently, of cellulose acetates, cellulose acetates with a low degree of substitution having a total degree of acetyl substitution of about 0.3 to about 1.2 are known to be soluble in, or have high affinity for, water.

For example, Japanese Examined Patent Application Publication No. H01-13481 discloses a water-soluble cellulose acetate having a total degree of acetyl substitution of 0.3 to 0.8 and a ratio of a degree of acetyl substitution at the 6-position to the total degree of acetyl substitution of from 0.35 to 0.4. This literature describes that the cellulose acetate is obtained by hydrolyzing a highly substituted cellulose acetate having a total degree of acetyl substitution of 2.4 or more in the presence of a large amount of water by the catalysis of an inorganic acid such as hydrochloric acid or sulfuric acid.

Japanese Unexamined Patent Application Publication No. H04-261401 discloses a water-soluble cellulose acetate having a total degree of acetyl substitution of 0.4 to 0.9, a water-insoluble matter content of 1.5 percent by weight or less, and a weight-average molecular weight of $5 \times 10^3$ to $3 \times 10^6$. This literature describes that the water-soluble cellulose acetate is obtained by the combination of an acetylation step, a first hydrolysis step, and a second hydrolysis step. In the acetylation step, cellulose is acetylated at a high temperature for a short time in the presence of a small amount of an acidic catalyst. In the first hydrolysis step, the resulting cellulose acetate having a high degree of acetyl substitution is hydrolyzed at a high temperature for a short time. In the second hydrolysis step, the cellulose acetate is further hydrolyzed at a relatively high temperature for a short time in the presence of a small amount of an acidic catalyst.

Japanese Unexamined Patent Application Publication (Translation of PCT Application) No. H05-500684 and Japanese Unexamined Patent Application Publication (Translation of PCT Application) No. H05-501129 disclose methods in which a cellulose ester is subjected to a treatment with a specific solvolysis promoter in the presence of a specific solvent to give a cellulose ester having a lower degree of substitution. The literature mentions that the methods give a cellulose ester having a degree of substitution of 0.4 to 1.2 from a cellulose ester having a degree of substitution of 2 to 3.

CITATION LIST

Patent Literature

PTL 1: Japanese Examined Patent Application Publication No. H01-13481
PTL 2: Japanese Unexamined Patent Application Publication No. H04-261401
PTL 3: Japanese Unexamined Patent Application Publication (Translation of PCT Application) No. H05-500684
PTL 4: Japanese Unexamined Patent Application Publication (Translation of PCT Application) No. H05-501129

SUMMARY OF INVENTION

Technical Problem

Disadvantageously, however, such cellulose acetates with a low degree of substitution obtained by the conventional methods have low strength/elongation when formed into films and/or fibers and fail to be practically used in the applications typically as films and fibers.

The present invention has an object to provide a cellulose acetate having high water-solubility which still can give a film and/or a fiber having strength/elongation at high levels even as having a low degree of substitution.

The present invention has another object to provide a cellulose acetate formed article that has strength/elongation at high levels, and is still highly soluble in water, where the formed article is exemplified by films and fibers.

Solution to Problem

After intensive investigations to achieve the objects, the present inventors have found that even a cellulose acetate with a low degree of substitution, when having a compositional distribution index (CDI) at a specific level or less, can be formed typically into a film or fiber having strength/elongation at high levels, where the compositional distribution index is defined as the ratio of a measured value of half height width of chemical composition to a theoretical value of half height width of chemical composition. The present invention has been made based on these findings.

Specifically, the present invention provides, in one aspect, a cellulose acetate having a total degree of acetyl substitution of 0.4 to 1.1. The cellulose acetate has a compositional distribution index (CDI) as specified by a formula of 3.0 or less, where the formula is expressed as follows:

CDI=(Measured value of half height width of chemical composition)/(Theoretical value of half height width of chemical composition)

In the formula, the measured value of half height width of chemical composition is a half height width of chemical composition determined by HPLC analysis of a cellulose acetate propionate prepared by propionylating all residual hydroxy groups of the cellulose acetate (sample); and the theoretical value of half height width of chemical composition is specified by the formula:

Theoretical value of half height width of chemical composition=$2 \cdot 35482 \sqrt{3*DPw*(DS/3)*(1-DS/3)}/DPw$     [Math. 1]

where DS represents the total degree of acetyl substitution, and DPw represents a weight-average degree of polymerization determined by a GPC-light scattering method using a cellulose acetate propionate prepared by propionylating all residual hydroxy groups of the cellulose acetate (sample).

The cellulose acetate may have a CDI of 2.8 or less, and may have a CDI of 2.0 or less.

The cellulose acetate may have a standard deviation σ of 0.08 or less, where the standard deviation σ is of degrees of acetyl substitution at 2-position, 3-position, and 6-position and is specified by formula:

$$\sigma^2 = \frac{1}{n-1}\sum_{i=1}^{n}(x_i - \bar{x})^2 \qquad \text{[Math. 2]}$$

where σ represents the standard deviation; n is 3; of $x_i$, $x_1$ represents the degree of substitution at the 2-position, $x_2$ represents the degree of substitution at the 3-position, and $x_3$ represents the degree of substitution at the 6-position; and $\bar{x}$=(Total degree of acetyl substitution)/3.

The cellulose acetate preferably has a polydispersity (dispersity; Mw/Mn) of from 1.2 to 2.5. The polydispersity relates to the molecular weight distribution and degree of polymerization distribution and is a value determined by the GPC-light scattering method using a cellulose acetate propionate prepared by propionylating all residual hydroxy groups of the cellulose acetate (sample).

The cellulose acetate preferably has a weight-average degree of polymerization (DPw) of from 50 to 800, where the weight-average degree of polymerization is a value determined by the GPC-light scattering method using a cellulose acetate propionate prepared by propionylating all residual hydroxy groups of the cellulose acetate (sample).

The present invention provides, in another aspect, a method for producing the cellulose acetate. The method includes partially hydrolyzing a cellulose acetate at a temperature of 90° C. or higher to give the cellulose acetate having a lower degree of substitution.

The present invention provides, in yet another aspect, a formed article formed from the cellulose acetate.

In addition and advantageously, the present invention provides a fiber or film formed from the cellulose acetate.

Advantageous Effects of Invention

The cellulose acetate according to the present invention is highly soluble in water, has a low degree of substitution, but can still be formed into a formed article (e.g., a fiber) that has strength and elongation at high levels. In particular, the cellulose acetate, when having a CDI of 2.0 or less, is highly soluble in water, has a low degree of substitution, but can still be formed into a film having strength/elongation (tensile strength and elongation at break) at high levels. The cellulose acetate is usable as water-soluble or hydrophilic polymeric materials typically for tablet binders, tablet coating agents, binders of staple fiber, cosmetic thickeners, cosmetic moisturizers, excipients or fillers, and materials for formed articles such as fibers and films.

The formed article (e.g., a film or fiber) according to the present invention is formed from the cellulose acetate according to the present invention, thereby has strength/elongation at high levels, and is still highly soluble in water.

BRIEF DESCRIPTION OF DRAWINGS

FIG. 1 is a graph illustrating how the tensile strength (kgf/cm²) varies depending on the CDI in films (50 μm thick) obtained in examples and comparative examples.

FIG. 2 is a graph illustrating how the elongation at break (%) varies depending on the CDI in the films (50 μm thick) obtained in the examples and comparative examples.

FIG. 3 is a graph illustrating how the breaking strength (g/d) varies depending on the CDI in fibers (yarns) having a fineness of 16.7 d and fibers (yarns) having a fineness of 9 d (380° C.) each prepared from the cellulose acetates obtained in the examples and comparative examples.

FIG. 4 is a graph illustrating how the elongation (%) varies depending on the CDI in fibers (yarns) having a fineness of 16.7 d and fibers (yarns) having a fineness of 9 d (380° C.) each prepared from the cellulose acetates obtained in the examples and comparative examples.

DESCRIPTION OF EMBODIMENTS

The cellulose acetate according to the present invention has a total degree of acetyl substitution of 0.4 to 1.1 and has a compositional distribution index (CDI) of 3.0 or less, where the compositional distribution index is defined as the ratio of the measured value of half height width of chemical composition to the theoretical value of half height width of chemical composition.

Total Degree of Acetyl Substitution

The cellulose acetate according to the present invention has a total degree of acetyl substitution (average degree of acetyl substitution) of 0.4 to 1.1. A cellulose acetate, when having a total degree of acetyl substitution within this range, is highly soluble in water, but, if having a total degree of acetyl substitution out of the range, has inferior solubility in water. The cellulose acetate according to the present invention may have a total degree of acetyl substitution of preferably from 0.5 to 1.0, and more preferably from 0.6 to 0.95. The total degree of acetyl substitution can be measured by a known titrimetry in which the degree of substitution of a sample cellulose acetate is determined after dissolving the cellulose acetate in water. The total degree of acetyl substitution can also be measured by propionylating hydroxy groups of the cellulose acetate (see a method mentioned later) to give a cellulose acetate propionate, dissolving the cellulose acetate propionate in deuterated chloroform, and subjecting the same to NMR analysis.

The total degree of acetyl substitution may be determined by determining an acetylation degree according to a method of measuring acetylation degree prescribed in ASTM D-817-91 (Standard Test Methods of Testing Cellulose Acetates) and converting the acetylation degree into the total degree of acetyl substitution according to a formula, where this is most common determination of the degree of substitution of a cellulose acetate, where the formula is expressed as follows:

$$DS=162.14\times AV\times0.01/(60.052-42.037\times AV\times0.01)$$

where:
DS represents the total degree of acetyl substitution; and
AV represents the acetylation degree (%).

Initially, 500 mg of a dried cellulose acetate (sample) is precisely weighed, dissolved in 50 ml of 4:1 (volume ratio) solvent mixture of ultrapure water and acetone, and combined with 50 ml of a 0.2 N aqueous sodium hydroxide solution, followed by saponification at 25° C. for 2 hours. Next, 50 ml of 0.2 N hydrochloric acid is added, and the amount of eliminated acetic acid is determined by titration with a 0.2 N aqueous sodium hydroxide solution (0.2 N sodium hydroxide normal solution) using phenolphthalein as an indicator. In addition, a blank test is performed in a similar manner, except for using no sample. Based on these, the acetylation degree AV (%) is calculated according to the formula:

$$AV(\%)=(A-B)\times F\times 1.201/\text{sample weight(g)}$$

where:
"A" represents the titer (ml) of the 0.2 N sodium hydroxide normal solution;
"B" represents the titer (ml) of the 0.2 N sodium hydroxide normal solution in the blank test; and
"F" represents the factor of the 0.2 N sodium hydroxide normal solution.

Compositional Distribution Index (CDI)

The cellulose acetate according to the present invention has a compositional distribution index (CDI) of 3.0 or less (e.g., 1.0 to 3.0). The cellulose acetate may have a compositional distribution index (CDI) of preferably 2.8 or less, more preferably 2.0 or less, furthermore preferably 1.8 or less, particularly preferably 1.6 or less, and most preferably 1.3 or less.

The lower limit of the compositional distribution index (CDI) is 0. This can be achieved by special synthesis techniques such as a technique in which the 6-position of a glucose residue alone is selectively acetylated with a selectivity of 100% while no other position is acetylated. However, such synthesis techniques have not yet been known. When hydroxy groups of the glucose residue are acetylated and deacetylated all at the same probability, the compositional distribution index CDI stands at 1.0. However, considerable ways and means are required to approach the ideal state as above in actual cellulose reactions. Conventional techniques, however, have directed little attention toward the control of the compositional distribution.

The cellulose acetate according to the present invention has a low compositional distribution index (CDI), has a uniform compositional distribution (intermolecular substitution degree distribution), and can thereby be formed into a film that has strength/elongation at very high levels in spite of having a low degree of substitution. This is because the uniform compositional distribution contributes to reduction of defects in the film structure. In addition, the cellulose acetate, as having the uniform compositional distribution, can ensure satisfactory water solubility in a range of total degree of substitution wider than conventional equivalents.

The "compositional distribution index (CDI)" herein is defined as the ratio of the measured value of half height width of chemical composition to the theoretical value of half height width of chemical composition [(Measured value of half height width of chemical composition)/(Theoretical value of half height width of chemical composition)]. The "half height width of chemical composition" is also referred to as "half height width of intermolecular substitution degree distribution" or simply to "half height width of substitution degree distribution".

The evaluation of uniformity of the total degree of acetyl substitution of a cellulose acetate can be performed with, as an index, the magnitude of half height width of a maximum peak in an intermolecular substitution degree distribution curve of the cellulose acetate. The half height width is also called "half peak width". The "half height width" refers to a width of a chart at a height half the peak height (maximum height) in the chart, in which the chart is plotted with the abscissa (X-axis) indicating a degree of acetyl substitution and the ordinate (Y-axis) indicating an abundance at that degree of acetyl substitution. The half height width is an index indicating how the distribution disperses. The half height width of substitution degree distribution can be determined by high-performance liquid chromatographic (HPLC) analysis. A way to convert the abscissa (elution time) in an elution curve of a cellulose ester in HPLC into a degree of substitution (0 to 3) is described in Japanese Unexamined Patent Application Publication No. 2003-201301 (paragraphs [0037] to [0040]).

Theoretical Value of Half Height Width of Chemical Composition

The theoretical value of half height width of chemical composition (half height width of substitution degree distribution) can be calculated stochastically. Specifically, the theoretical value of half height width of chemical composition can be determined according to Formula (1):

[Math. 3]

$$\text{Theoretical value of half height width of chemical composition} = 2\cdot 35482\sqrt{mpq}/DPw \quad (1)$$

where:
m represents the total number of hydroxy group(s) and acetyl group(s) per molecule of the cellulose acetate;
p represents the probability of substitution of hydroxy group with acetyl group in one molecule of the cellulose acetate;

$$q=1-p;$$

DPw represents the weight-average degree of polymerization as determined by the GPC-light scattering method.

The method for measuring the weight-average degree of polymerization (DPw) will be described later.

The theoretical value of half height width of chemical composition is expressed by Formula (2) based on the degree of substitution and the degree of polymerization. Formula (2) is defined as a definitional formula to determine the theoretical value of half height width of chemical composition. Formula (2) is expressed as follows:

[Math. 4]

$$\text{Theoretical value of half height width of chemical composition} = 2\cdot 35482\sqrt{3*DPw*(DS/3)*(1-DS/3)}/DPw \quad (2)$$

where:
DS represents the total degree of acetyl substitution; and
DPw represents the weight-average degree of polymerization as determined by the GPC-light scattering method.

The method for measuring the weight-average degree of polymerization (DPw) will be described later.

To be more exact, Formulae (1) and (2) should take the degree of polymerization distribution into consideration. In this case, "DPw" in Formulae (1) and (2) should be replaced with the function of the degree of polymerization distribution, and the entire formulae should be integrated from a degree of polymerization of 0 to infinity. However, Formulae (1) and (2) give a theoretical value with an approximately sufficient precision as long as they employ DPw. If a number-average degree of polymerization (DPn) is employed in these formulae, the degree of polymerization distribution affects to an extent not negligible. To prevent this, DPw should be used herein.

Measured Value of Half Height Width of Chemical Composition

The "measured value of half height width of chemical composition" in the present invention refers to a half height width of chemical composition which is obtained by HPLC analysis using a cellulose acetate propionate prepared by propionylating all residual hydroxy groups (unsubstituted hydroxy groups) of a cellulose acetate (sample).

In general, a cellulose acetate having a total degree of acetyl substitution of 2 to 3 can be subjected to high-performance liquid chromatography (HPLC) analysis without pretreatment, by which the half height width of chemical composition can be determined. Typically, Japanese Unexamined Patent Application Publication No. 2011-158664 describes a method for analyzing the compositional distribution of a cellulose acetate having a degree of substitution of 2.27 to 2.56.

In contrast, the measured value of half height width of chemical composition (half height width of substitution degree distribution) in the present invention is determined by subjecting residual hydroxy groups in the molecule of the cellulose acetate to derivatization as a pretreatment before HPLC analysis, and then subjecting the resulting derivative to the HPLC analysis. The pretreatment is performed in order to convert the cellulose acetate with a low degree of substitution into a derivative that can be readily dissolved in an organic solvent to enable the HPLC analysis. Specifically, in the present invention, all residual hydroxy groups in the molecule are completely propionylated to give a completely-derivatized cellulose acetate propionate (CAP), and the completely-derivatized cellulose acetate propionate (CAP) is analyzed by HPLC to determine the half height width of chemical composition (measured value). The derivatization herein should be performed completely so that the molecule includes no residual hydroxy group, but acetyl group(s) and propionyl group(s) alone. Specifically, the total of the degree of acetyl substitution (DSac) and the degree of propionyl substitution (DSpr) should be 3. This is because a relational expression: DSac+DSpr=3 is used to plot a calibration curve so as to convert the abscissa (elution time) in the HPLC elution curve of the cellulose acetate propionate (CAP) into the degree of acetyl substitution (0 to 3).

The complete derivatization of cellulose acetate can be performed by allowing propionic anhydride to act upon the cellulose acetate by the catalysis of N,N-dimethylaminopyridine in a pyridine/N,N-dimethylacetamide solvent mixture. More specifically, the propionylation may be performed at a temperature of 100° C. for a reaction time of 1.5 to 3.0 hours using a 1:1 (v/v) solvent mixture of pyridine and N,N-dimethylacetamide as a solvent in an amount of 20 parts by weight relative to the cellulose acetate (sample), propionic anhydride as a propionylating agent in an amount of 6.0 to 7.5 equivalents relative to hydroxy group(s) of the cellulose acetate by the catalysis of N,N-dimethylaminopyridine in an amount of 6.5 to 8.0 mole percent relative to the hydroxy group(s) of the cellulose acetate. The reaction mixture after the reaction is subjected to precipitation from methanol as a precipitation solvent and yields a completely derivatized cellulose acetate propionate. Furthermore specifically, 1 part by weight of the reaction mixture is placed into 10 parts by weight of methanol at room temperature to be precipitated, the resulting precipitates are washed with methanol five times, vacuum-dried at 60° C. for 3 hours, and yields the completely derivatized cellulose acetate propionate (CAP). The after-mentioned polydispersity (Mw/Mn) and weight-average degree of polymerization (DPw) are determined by derivatizing the cellulose acetate (sample) by this method to give a completely derivatized cellulose acetate propionate (CAP), and measuring the parameters using the completely derivatized cellulose acetate propionate (CAP).

The HPLC analysis may be performed as follows. Two or more cellulose acetate propionates having different degrees of acetyl substitution as reference standards are subjected to HPLC analysis using a predetermined measuring apparatus under predetermined measuring conditions, and values of these reference standards measured by the analysis are plotted to give a calibration curve. The calibration curve is a curve indicating a relationship between the elution time and the degree of acetyl substitution (0 to 3) of cellulose acetate propionates and is generally a cubic curve. Based on the calibration curve, the half height width of chemical composition (measured value) of the cellulose acetate (sample) can be determined. What is determined by the HPLC analysis is the relationship between the elution time and the degree of acetyl substitution distribution of cellulose acetate propionates. This is the relationship between the elution time and the degree of acetyl substitution distribution of a substance corresponding to the sample, except with all residual hydroxy groups in the sample molecule being converted into propionyloxy groups. This determination is therefore essentially not different from the determination of the degree of acetyl substitution distribution of the cellulose acetate according to the present invention.

The HPLC analysis conditions are as follows:

Apparatus: Agilent 1100 Series

Columns: Waters Corporation, Nova-Pak phenyl 60 Å 4 μm (150 mm in length by 3.9 mm in diameter)+guard column Column temperature: 30° C.

Detection: Varian 380-LC

Injection volume: 5.0 μL (sample concentration: 0.1% (wt/vol))

Eluents: Eluent A: $MeOH/H_2O=8/1$ (v/v), Eluent B: $CHCl_3/MeOH=8/1$ (v/v)

Gradient: A/B=80/20→0/100 (28 min.); Flow rate: 0.7 mL/min.

A substitution degree distribution curve is determined from the calibration curve. The curve is a substitution degree distribution curve of the cellulose acetate propionate, with the ordinate indicating the abundance of the cellulose acetate propionate and the abscissa indicating the degree of acetyl substitution. The curve is also referred to as an "intermolecular substitution degree distribution curve". In the substitution degree distribution curve, a half height width of substitution degree distribution is determined on a maximum peak (E) corresponding to the average degree of substitution in the following manner. Specifically, a base line (A-B) tangent is drawn from a base point (A) at a lower degree of substitution and a base point (B) at a higher degree of substitution of the maximum peak (E). With respect to the base line, a perpendicular line is drawn from the maximum peak (E) toward the abscissa, and an intersection (C) between the perpendicular line and the base line (A-B) is determined. A midpoint (D) between the maximum peak (E) and the intersection (C) is then determined. A line including the midpoint (D) is drawn parallel to the base line (A-B) to determine two intersections (A' and B') of the line and the intermolecular substitution degree distribution curve. From the intersections (A' and B'), perpendicular lines are drawn to the abscissa. The interval between the feet of the thus-drawn perpendicular lines is defined as the half height width of the maximum peak (namely, the half height width of substitution degree distribution).

The half height width of substitution degree distribution as above reflects that the retention times of cellulose acetate propionate molecules contained in the sample vary depending on how hydroxyl groups of glucose rings in individual high-molecular chains constituting the cellulose acetate propionate molecules are acetylated. Therefore, the width of the retention time ideally indicates the width of compositional distribution in the substitution degree unit. However, a high-performance liquid chromatograph includes a duct that does not contribute to the partition (distribution), such as a guide column for protecting the measuring column. The width of retention time often includes an error that is caused not by the width of compositional distribution, but by the configuration of the measuring apparatus. The error is affected typically by the length and inner diameter of the column, and the length and routing of piping from the column to a detector, and varies depending on the configuration of the measuring apparatus, as mentioned above. Thus, the half height width of substitution degree distribution of the cellulose acetate propionate may be determined as a corrected value Z corrected according to a compensation formula. The compensation formula can give a more accurate half height width of substitution degree distribution as a constant or substantially constant value not depending on the type of a measuring apparatus and the measuring conditions. The compensation formula is generally represented by the following formula:

$$Z=(X^2-Y^2)^{1/2}$$

where X represents the half height width of substitution degree distribution (uncorrected value) determined with the predetermined measuring apparatus under predetermined measuring conditions; and Y is specified by the formula: $Y=(a-b) x/3+b$ ($0 \le x \le 3$), where "a" represents the apparent half height width of substitution degree distribution of a cellulose acetate having a total degree of substitution of 3 as determined with the same measuring apparatus under the same measuring conditions as in X, where this cellulose acetate does not actually have a substitution degree distribution because of having a total degree of substitution of 3; "b" represents the apparent half height width of substitution degree distribution of a cellulose propionate having a total degree of substitution of 3 as determined with the same measuring apparatus under the same measuring conditions as in X; and "x" represents the total degree of acetyl substitution of the measurement sample ($0 \le x \le 3$).

The "cellulose acetate (or cellulose propionate) having a total degree of substitution of 3" refers to a cellulose ester that corresponds to cellulose, except for all hydroxy groups of the cellulose being esterified, and actually (ideally) does not have a half height width of substitution degree distribution (namely, has a half height width of substitution degree distribution of 0).

The cellulose acetate according to the present invention may have a measured value of half height width of chemical composition (half height width of substitution degree distribution) of preferably 0.12 to 0.34, and more preferably 0.13 to 0.25.

The above-described theoretical formula of substitution degree distribution is a stochastically calculated value on the assumption that all acetylation and deacetylation proceed independently and evenly, that is, a calculated value according to a binomial distribution. Such ideal situation unlikely occurs realistically. A cellulose ester has a substitution degree distribution significantly wider than one stochastically determined according to the binomial distribution, unless a special scheme is made to allow the hydrolysis reaction of the cellulose acetate approaches the ideal random reaction and/or to perform a treatment after the reaction so as to give fractionation in the composition.

One of possible special schemes for the reaction is exemplified by maintaining the system under such conditions that deacetylation and acetylation are in equilibrium (are balanced). This scheme, however, is not preferred because the cellulose decomposition proceeds by the acid catalyst in this case. Another special scheme for the reaction is employing such reaction conditions that deacetylation proceeds at a lower rate for a low-substituted cellulose ester. However, no specific method to achieve this has yet been known. Specifically, there is no known special scheme for the reaction to control the substitution degree distribution of a cellulose ester so as to be in accordance with the binomial distribution reaction stochastically. In addition, there occur various circumstances, such as heterogeneity of the acetylation process (cellulose acetylation step) and partial/temporal precipitation by water added stepwise in the hydrolysis process (cellulose acetate hydrolysis step). These circumstances cause the substitution degree distribution to be wider than the binomial distribution. The reality is that it is impossible to avoid all of them and to achieve the ideal conditions. This resembles that an ideal gas is strictly a product of ideals, and an actual gas behaves somewhat differently from this.

Conventional techniques relating to the synthesis and treatment of a cellulose acetate with a low degree of substitution have paid little attention to the issues of the substitution degree distribution and have not performed measurement, verification, and consideration of the substitution degree distribution. For example, literature (Journal of the Society of Fiber Science and Technology, Japan, 42, p. 25 (1986)) argues that the solubility of a cellulose acetate with a low degree of substitution is determined by the distribution of acetyl groups to the 2-, 3-, and 6-positions of glucose residue and gives no consideration to the compositional distribution at all.

Surprisingly, however, the substitution degree distribution of a cellulose acetate can be controlled according to the present invention by performing a treatment under adjusted conditions after the cellulose acetate hydrolysis step, as described later. Other literature (CiBment, L., and Rivibre, C., Bull. SOC. chim., (5)1, 1075 (1934); Sookne, A. M., Rutherford, H. A., Mark, H., and Harris, M. J., Research Natl. Bur. Standards, 29, 123 (1942); A. J. Rosenthal, B. B. White, Ind. Eng. Chem., 1952, 44(11), pp. 2693-2696.) mentions that a cellulose acetate having a degree of substitution of 2.3 offers, upon precipitation fractionation, fractionation depending on the molecular weight and marginal fractionation accompanied with the degree of substitution (chemical composition). It has not yet been reported that the degree of substitution (chemical composition) can offer remarkable fractionation as in the present invention. In addition, it has not yet been verified that the substitution degree distribution (chemical composition) of a cellulose acetate with a low degree of substitution as in the present invention can be controlled by dissolution fractionation or precipitation fractionation.

Another scheme found by the present inventors so as to narrow the substitution degree distribution is a hydrolysis reaction (ripening reaction) of the cellulose acetate performed at a high temperature of 90° C. or higher (or higher than 90° C.). The conventional techniques fail to make detailed analyses and considerations on the degree of polymerization of a product obtained by such a high temperature reaction, but it has been believed that cellulose decomposition preferentially occurs in a high-temperature reaction at 90° C. or higher. This view is considered to be an assumption (stereotype) based only on the consideration relating to viscosity. The present inventors have found as follows. Assume that, upon hydrolysis to give a cellulose acetate with a low degree of substitution, the reaction of a cellulose acetate is performed in a large amount of acetic acid at a high temperature of 90° C. or higher (or higher than 90° C.)

preferably in the presence of a strong acid such as sulfuric acid. In this case, the cellulose acetate does not undergo reduction in degree of polymerization, but undergoes reduction in viscosity with reduction in CDI. Specifically, the present inventors have clarified that the reduction in viscosity with the high temperature reaction is caused not by reduction in degree of polymerization, but by reduction in structural viscosity because of narrowed substitution degree distribution. The cellulose acetate, when hydrolyzed under the conditions, allows the product (cellulose acetate with a low degree of substitution) to have an extremely low CDI and to have significantly better solubility in water. This is because not only a forward reaction, but also a reverse reaction occur upon the hydrolysis. In contrast to this, the cellulose acetate, when hydrolyzed under such conditions for the reverse reaction as to be unlikely to occur, causes the resulting product to have a wider substitution degree distribution due to various factors and to include a cellulose acetate having a total degree of acetyl substitution of less than 0.4 and a cellulose acetate having a degree of acetyl substitution of greater than 1.1 in larger contents, both of which are poorly soluble in water. Thus, the resulting cellulose acetate as a whole has lower solubility in water.

Standard Deviation of Degree of Substitution at 2-, 3-, and 6-Positions

The degrees of acetyl substitution at the 2-, 3-, and 6-positions of the glucose ring of the cellulose acetate according to the present invention can be measured by NMR technique according to the method described by Tezuka in Carbonydr. Res. 273, 83(1995). Specifically, free hydroxy group(s) of a cellulose acetate sample is propionylated with propionic anhydride in pyridine. The resulting sample is dissolved in deuterated chloroform and subjected to $^{13}$C-NMR spectral measurement. Carbon signals of acetyl group appear in the order of the 2-position, 3-position, and 6-position from a higher magnetic field in a region of from 169 ppm to 171 ppm, and carbonyl carbon signals of propionyl group appear in the same order in a region of from 172 ppm to 174 ppm. The degrees of acetyl substitution at the 2-, 3-, and 6-positions in the glucose ring of the original cellulose diacetate can be determined based on abundance ratios between acetyl group and propionyl group at the corresponding positions, respectively. The total of the thus-obtained degrees of acetyl substitution at the 2-, 3-, and 6-positions is the total degree of acetyl substitution. The total degree of acetyl substitution can also be determined in the above manner. The total degree of acetyl substitution can be analyzed not only by $^{13}$C-NMR, but also by $^{1}$H-NMR.

The standard deviation σ of the degrees of substitution at the 2-, 3-, and 6-positions is defined by the formula:

$$\sigma^2 = \frac{1}{n-1}\sum_{i=1}^{n}(x_i - \bar{x})^2 \qquad [\text{Math. 5}]$$

where:
σ represents the standard deviation;
n is 3;
of $x_i$, $x_1$ represents the degree of substitution at the 2-position, $x_2$ represents the degree of substitution at the 3-position, and $x_3$ represents the degree of substitution at the 6-position; and
$\bar{x}$=(Total degree of acetyl substitution)/3.

In the present invention, the cellulose acetate preferably has a standard deviation of degrees of acetyl substitution at the 2-, 3-, and 6-positions of glucose ring of 0.08 or less (0 to 0.08). The cellulose acetate, when having a standard deviation of 0.08 or less, is approximately evenly substituted at the 2-, 3-, and 6-positions of glucose ring and is highly soluble in water. In addition, this cellulose acetate, when formed into a film, offers strength/elongation at high levels.

Polydispersity (Mw/Mn)

The polydispersity (Mw/Mn) in the present invention refers to a value determined by the GPC-light scattering method using a cellulose acetate propionate prepared by propionylating all residual hydroxy groups of the cellulose acetate (sample).

The cellulose acetate according to the present invention preferably has a polydispersity (dispersity; Mw/Mn) of from 1.2 to 2.5. The cellulose acetate, when having a polydispersity Mw/Mn within the range, includes molecules of approximately uniform sizes, is highly soluble in water, and, when formed into a film, offers strength/elongation at high levels.

The number-average molecular weight (Mn), weight-average molecular weight (Mw), and polydispersity (Mw/Mn) of the cellulose acetate can be determined by a known method using HPLC. The polydispersity (Mw/Mn) of the cellulose acetate in the present invention may be determined in the following manner. The cellulose acetate (sample) is converted into a completely derivatized cellulose acetate propionate (CAP) by a procedure similar to the determination of the measured value of half height width of chemical composition, so as to give a measurement sample soluble in an organic solvent. The completely derivatized cellulose acetate propionate (measurement sample) is analyzed by size exclusion chromatography under conditions as follows (GPC-light scattering method):

Apparatus: Shodex GPC SYSTEM-21H;
Solvent: Acetone;
Column: Two GMHx1 columns (Tosoh Corporation) with a corresponding guard column;
Flow rate: 0.8 ml/min.;
Temperature: 29° C.;
Sample concentration: 0.25% (wt/vol);
Injection volume: 100 μl;
Detection: MALLS (multi-angle light scattering detector) (Wyatt Technology Corporation, DAWN-EOS); and
Reference material for MALLS calibration: PMMA (having a molecular weight of 27600).

Weight-Average Degree of Polymerization (DPw)

The weight-average degree of polymerization (DPw) in the present invention is a value as determined by the GPC-light scattering method using a cellulose acetate propionate prepared by propionylating all residual hydroxy groups of the cellulose acetate (sample).

The cellulose acetate according to the present invention preferably has a weight-average degree of polymerization (DPw) of from 50 to 800. The cellulose acetate, if having an excessively low weight-average degree of polymerization (DPw), may readily offer strength/elongation at low levels. In contrast, the cellulose acetate, if having an excessively high weight-average degree of polymerization (DPw), may readily have inferior filterability. The cellulose acetate may have a weight-average degree of polymerization (DPw) of more preferably 55 to 700, and furthermore preferably 60 to 600.

The weight-average degree of polymerization (DPw) may be determined in the following manner. The cellulose acetate (sample) is converted into a completely derivatized cellulose acetate propionate (CAP) by a procedure similar to the determination of the measured value of half height width of chemical composition, as in the determination of the polydispersity (Mw/Mn). The completely derivatized cellulose acetate propionate is then analyzed by size exclusion chromatography to determine the weight-average degree of polymerization (DPw) (GPC-light scattering method).

The molecular weights (degree of polymerization) and polydispersity (Mw/Mn) of a water-soluble cellulose acetate are measured by the GPC-light scattering method (e.g., GPC-MALLS or GPC-LALLS), as is described above. In this connection, light scattering detection is generally difficult in an aqueous solvent. This is because such aqueous solvent includes a large amount of foreign matter and is liable to be contaminated secondarily even after being once purified. In addition, the aqueous solvent may suffer from unstable spreading of its molecular chain due to an ion dissociative functional group present in a trace amount. Assume that a water-soluble inorganic salt (e.g., sodium chloride) is added to prevent this. In this case, the solute may become an unstable dissolution state and form an aggregate or assembly in the resulting aqueous solution. In one of effective methods to avoid this issue, the water-soluble cellulose acetate is derivatized so as to be soluble in an organic solvent, and subjected to GPC-light scattering measurement in the organic solvent, because such an organic solvent contains a small amount of foreign matter and is resistant to secondary contamination. The derivatization of the water-soluble cellulose acetate for this purpose effectively employs propionylation. Specific reaction conditions and treatment are as described in the determination of measured value of half height width of chemical composition.

Viscosity at 6%

The cellulose acetate according to the present invention may have a viscosity at 6% of typically 5 to 500 mPa·s, and preferably 6 to 300 mPa·s. The cellulose acetate, if having an excessively high viscosity at 6%, may have inferior filterability. The cellulose acetate, if having an excessively low viscosity at 6%, may readily offer strength/elongation at lower levels when formed into a film.

The viscosity at 6% of the cellulose acetate can be measured by a method as follows.

An aliquot (3.00 g) of a dried sample is placed in a 50-ml volumetric flask and combined with and dissolved in distilled water to give a 6 wt/vol percent solution. The solution is transferred into a predetermined Ostwald viscometer up to a mark, followed by temperature regulation at 25±1° C. for about 15 minutes. The sample solution is allowed to flow between two marks, the time of flow of the solution is measured, and the viscosity at 6% is calculated according to the formula:

Viscosity at 6% (mPa·s)=$C \times P \times t$ where:
C is the constant of the sample solution;
P is the density (0.997 g/cm$^3$) of the sample solution; and
t is the time in second of flow of the sample solution.

The sample solution constant is determined by measuring the flow time of a standard liquid for calibrating viscometer [trade name JS-200, supplied by SHOWA SHELL SEKIYU K. K. (in conformity with Japanese Industrial Standard (JIS) Z 8809] by the above procedure, and calculating the constant according to the following formula:

Sample solution constant=[Absolute viscosity (mPa·s) of standard solution]/[(Density (g/cm$^3$) of standard solution)×(Flow time (second) of standard solution)]

Tensile Strength and Elongation at Break

The cellulose acetate according to the present invention has a low compositional distribution index (CDI) and has a narrow compositional distribution (intermolecular substitution degree distribution), as is described above. The cellulose acetate, when formed typically into a film, can thereby allow the film to have a higher tensile strength and a higher elongation at break. In particular, the cellulose acetate, when having a CDI of 2.0 or less, can allow the film to have a tensile strength and an elongation at break at very high levels. The cellulose acetate may have a CDI of preferably 1.8 or less, furthermore preferably 1.6 or less, and particularly preferably 1.3 or less.

The film can have a tensile strength (at 22° C. and a tensile speed of 100 mm/min.) of 500 kgf/cm$^2$ or more (e.g., 500 to 1200 kgf/cm$^2$), preferably 800 kgf/cm$^2$ or more (e.g., 800 to 1100 kgf/cm$^2$), and furthermore preferably 840 kgf/cm$^2$ or more (e.g., 840 to 1000 kgf/cm$^2$) at a thickness of 50 μm. The film can have an elongation at break (at 22° C. and a tensile speed of 100 mm/min.) of 5.0% or more (e.g., 5.0% to 15%), preferably 7.5% or more (e.g., 7.5% to 13%), furthermore preferably 8.5% or more (e.g., 8.5% to 11%) at a thickness of 50 μm, in spite of having a low degree of substitution.

The tensile strength and elongation at break can be measured by a method as follows. Specifically, the cellulose acetate sample is dissolved in distilled water to give a solution having a solids concentration of 5 to 15 percent by weight. The solution is cast onto a glass plate using a bar coater to give a film having a thickness of 50 μm. The film is stretched at room temperature (about 22° C.) at a tensile speed of 100 mm/min. using a tensile tester (UCT-5T supplied by ORIENTEC Co., Ltd.) with an temperature and humidity testing chambers, rooms (TLF-U3 supplied by ORIENTEC Co., Ltd.). A strength (i.e., tensile strength) (kgf/cm$^2$) and an elongation (i.e., elongation at break) (%) at break of the film are determined.

Production of Cellulose Acetate with a Low Degree of Substitution

The cellulose acetate according to the present invention may be produced typically by a hydrolysis step (ripening step) (A) of hydrolyzing a cellulose acetate having a medium to high degree of substitution, a precipitation step (B), and a washing/neutralizing step (C) that is performed as needed.

Hydrolysis Step (Ripening Step) (A)

In this step, a starting-material cellulose acetate is hydrolyzed. The "starting-material cellulose acetate" refers to a cellulose acetate having a medium to high degree of substitution. The cellulose acetate having a medium to high degree of substitution for use as the starting material may have a total degree of acetyl substitution of typically 1.5 to 3, and preferably 2 to 3. The starting-material cellulose acetate may be selected from cellulose diacetates having a total degree of acetyl substitution of 2.27 to 2.56 and cellulose triacetates having a total degree of acetyl substitution of greater than 2.56 to 3, each of which is commercially available.

The hydrolysis reaction may be performed by allowing the starting-material cellulose acetate to react with water in an organic solvent in the presence of a catalyst (ripening catalyst). The organic solvent is exemplified by acetic acid, acetone, alcohols (e.g., methanol), and solvent mixtures of them. Among them, a solvent containing at least acetic acid is preferred. The catalyst usable herein may be selected from catalysts generally used as deacetylation catalysts. Among them, sulfuric acid is preferred as the catalyst.

The organic solvent (e.g., acetic acid) may be used in an amount of typically 0.5 to 50 parts by weight, preferably 1 to 20 parts by weight, and more preferably 3 to 10 parts by weight, per 1 part by weight of the starting-material cellulose acetate.

The catalyst (e.g., sulfuric acid) may be used in an amount of typically 0.005 to 1 part by weight, preferably 0.01 to 0.5 part by weight, and more preferably 0.02 to 0.3 part by weight, per 1 part by weight of the starting-material cellulose acetate. The catalyst, if used in an excessively small amount, may cause the hydrolysis to require an excessively long time and may thereby cause the target cellulose acetate to have a lower molecular weight. In contrast, the catalyst, if used in an excessively large amount, may cause a larger variation (dispersion) of the depolymerization rate depending on the hydrolysis temperature and thereby cause a high depolymerization rate even at a relatively low hydrolysis temperature, and this may impede the production of a cellulose acetate having a certain high level of molecular weight.

The water in the hydrolysis step may be used in an amount of typically 0.5 to 20 parts by weight, preferably 1 to 10 parts by weight, and more preferably 2 to 7 parts by weight, per 1 part by weight of the starting-material cellulose acetate. The water may also be used in an amount of typically 0.1 to 5 parts by weight, preferably 0.3 to 2 parts by weight, and more preferably 0.5 to 1.5 parts by weight, per 1 part by weight of the organic solvent (e.g., acetic acid). The water may exist in the whole quantity in the system at the reaction start. However, to prevent cellulose acetate precipitation, part of the water to be used may exist in the system at the reaction start, with the remainder being added to the system in one or several batches during the reaction.

The reaction in the hydrolysis step may be performed at a temperature of typically 40° C. to 130° C., preferably 50° C. to 120° C., and more preferably 60° C. to 110° C. In particular, the reaction may be performed at a temperature of 90° C. or higher (or at a temperature higher than 90° C.). In this case, the reaction equilibrium tends to lie toward such a direction that the rate of a reverse reaction (acetylation) relative to a forward reaction (hydrolysis reaction) increases. This narrows the substitution degree distribution and can give a cellulose acetate with a low degree of substitution having a very low compositional distribution index CDI without particular scheming of treatment conditions. The reaction in this case preferably employs a strong acid such as sulfuric acid as the catalyst, and an excess amount of acetic acid as the reaction solvent. Assume that the reaction is performed at a temperature of 90° C. or lower. Even in this case, a cellulose acetate with a low degree of substitution having a very low compositional distribution index CDI can be obtained by performing precipitation in the precipitatioin step using a solvent mixture including two or more different solvents as a precipitation solvent; and/or by performing precipitation fractionation and/or dissolution fractionation in the precipitation step, as will be described later.

Precipitation Step (B)

In this step, the reaction system after the completion of the hydrolysis reaction is cooled down to room temperature, to which a precipitation solvent is added to precipitate a cellulose acetate with a low degree of substitution. The precipitation solvent usable herein can be selected from organic solvents miscible with water; and organic solvents having high solubility in water. Such solvents are exemplified by ketones such as acetone and methyl ethyl ketone; alcohols such as methanol, ethanol, and isopropyl alcohol; esters such as ethyl acetate; nitrogen-containing compounds such as acetonitrile; ethers such as tetrahydrofuran; and solvent mixtures of them.

The precipitation solvent may be selected from solvent mixtures including two or more different solvents. This offers similar effects to the after-mentioned precipitation fractionation and can give a cellulose acetate with a low degree of substitution having a narrow compositional distribution (intermolecular substitution degree distribution) and a low compositional distribution index CDI. Preferred examples of the solvent mixture include a solvent mixture of acetone and methanol; and a solvent mixture of isopropyl alcohol and methanol.

The cellulose acetate with a low degree of substitution obtained by precipitation may further be subjected to precipitation fractionation (fractional precipitation) and/or dissolution fractionation (fractional dissolution). This can give a cellulose acetate with a low degree of substitution having a narrow compositional distribution (intermolecular substitution degree distribution) and a very low compositional distribution index CDI.

The precipitation fractionation may be performed typically in the following manner. The cellulose acetate with a low degree of substitution (solid) obtained by precipitation is dissolved in water to give an aqueous solution having an appropriate concentration (typically 2 to 10 percent by weight, and preferably 3 to 8 percent by weight). A poor solvent is added to the aqueous solution (or, the aqueous solution is added to the poor solvent), the mixture is held at an appropriate temperature (typically 30° C. or lower, and preferably 20° C. or lower) to precipitate a cellulose acetate with a low degree of substitution as precipitates, and the precipitates are collected. The poor solvent is exemplified by alcohols such as methanol; and ketones such as acetone. The poor solvent may be used in an amount of typically 1 to 10 parts by weight, and preferably 2 to 7 parts by weight, per 1 part by weight of the aqueous solution.

The dissolution fractionation may be performed typically in the following manner. The cellulose acetate with a low degree of substitution (solid) obtained by precipitation or the cellulose acetate with a low degree of substitution (solid) obtained by precipitation fractionation is combined with a solvent mixture of water and an organic solvent (e.g., ketones such as acetone; and alcohols such as ethanol). The mixture is stirred at an appropriate temperature (e.g., 20° C. to 80° C., and preferably 25° C. to 60° C.) and separated into a dense phase and a dilute phase by centrifugal separation. The dilute phase is combined with a precipitation solvent (e.g., ketones such as acetone; and alcohols such as ethanol) to give precipitates (solid), and the precipitates are collected. The precipitation solvent is exemplified by ketones such as acetone; and alcohols such as methanol. The solvent mixture of water and the organic solvent may have an organic solvent concentration of typically 5 to 50 percent by weight, and preferably 10 to 40 percent by weight.

Washing/Neutralizing Step (C)

The precipitates (solid) obtained from the precipitation step (B) are preferably washed with an organic solvent (poor solvent). The organic solvent is exemplified by alcohols such as methanol; and ketones such as acetone. The precipitates are also preferably washed and neutralized with an organic solvent containing a basic substance. The organic solvent herein is exemplified by alcohols such as methanol; and ketones such as acetone.

The basic substance is exemplified by alkali metal compounds and alkaline earth metal compounds. The alkali metal compounds are exemplified by alkali metal hydroxides such as sodium hydroxide and potassium hydroxide; alkali metal carbonates such as sodium carbonate and potassium carbonate; alkali metal hydrogencarbonates such as sodium hydrogencarbonate; alkali metal carboxylates such as sodium acetate and potassium acetate; and sodium alkoxides such as sodium methoxide and sodium ethoxide. The alkaline earth metal compounds are exemplified by alkaline earth metal hydroxides such as magnesium hydroxide and calcium hydroxide; alkaline earth metal carbonates such as magnesium carbonate and calcium carbonate; alkaline earth metal carboxylates such as magnesium acetate and calcium acetate; and alkaline earth metal alkoxides such as magnesium ethoxide. Among them, potassium acetate and other alkali metal compounds are preferred.

The washing (and neutralization) can efficiently remove impurities such as the catalyst (e.g., sulfuric acid) used in the hydrolysis step.

Formed Article

The cellulose acetate according to the present invention can be used as a starting material to produce a formed article such as a film or fiber. The cellulose acetate may be combined with an appropriate additive upon the production of the formed article within a range not adversely affecting advantageous effects of the present invention.

For example, a cellulose acetate film may be prepared in the following manner. The cellulose acetate with a low degree of substitution is dissolved in a solvent such as an aqueous solvent to give a cellulose acetate with a low degree of substitution solution, the solution is cast onto a substrate using a coating device such as a bar coater, dried, and thereby yields the cellulose acetate film. The aqueous solvent is exemplified by water; and solvent mixtures of water and a water-soluble organic solvent. The cellulose acetate with a low degree of substitution solution may have a concentration not critical, but preferably 1 to 50 percent by weight, more preferably 2 to 40 percent by weight, and furthermore preferably 5 to 15 percent by weight from the viewpoints of handleability and productivity. The substrate is exemplified by, but not limited to, glass sheets and plates, plastic sheets and plates, and metal sheets and plates.

The resulting cellulose acetate film may have a thickness of typically 1 to 1000 μm, preferably 5 to 500 μm, and more preferably 10 to 250 μm.

The cellulose acetate film obtained in the above manner has a low degree of substitution, but still has a tensile strength and an elongation at break at high levels, as mentioned above.

Independently, a cellulose acetate fiber may be prepared in the following manner. The cellulose acetate with a low degree of substitution is dissolved in a solvent such as an aqueous solvent to give a cellulose acetate with a low degree of substitution solution (dope), the dope is discharged through a spinneret, dried, and yields the cellulose acetate fiber. The cellulose acetate with a low degree of substitution solution (dope) may have a concentration of typically preferably 1 to 60 percent by weight, more preferably 5 to 50 percent by weight, and furthermore preferably 10 to 40 percent by weight. This is preferred from the viewpoints of handleability and productivity. The aqueous solvent is exemplified by water; and solvent mixtures of water and a water-soluble organic solvent. The drying in spinning may be performed at a temperature of typically 100° C. or higher, and preferably about 100° C. to about 500° C.

The fiber obtained by spinning may have a fineness (filament denier) of typically about 1 to about 30 deniers (d), and preferably 5 to 20 deniers (d). The fineness can be controlled by regulating the discharge amount of the dope from the spinneret. The cellulose acetate fiber obtained in the above manner has a low degree of substitution, but still has strength and elongation at high levels. For example, the cellulose acetate fiber may have a breaking strength of typically 1.5 g/d or more (e.g., 1.5 to 2.4 g/d), and preferably 1.6 g/d or more (e.g., 1.6 to 2.2 g/d) when having a fineness of 9 deniers; and typically 2.1 g/d or more (e.g., 2.1 to 2.8 g/d), and preferably 2.2 g/d or more (e.g., 2.2 to 2.6 g/d) when having a fineness of 16.7 deniers, where the breaking strength is determined in conformity with JIS L 1015 at a temperature of 20° C.±2° C. and relative humidity of 65%±2%. The cellulose acetate fiber may have an elongation of typically 22% or more (e.g., 22% to 40%), and preferably 23% or more (e.g., 23% to 35%) when having a fineness of 9 deniers; and typically 10% or more (e.g., 10% to 18%), preferably 11% or more (e.g., 11% to 16%) when having a fineness of 16.7 deniers, where the elongation is determined in conformity with JIS L 1015 at a temperature of 20° C.±2° C. and relative humidity of 65%±2%.

EXAMPLES

The present invention will be illustrated in further detail with reference to several examples below. It should be noted, however, that the examples are by no means intended to limit the scope of the present invention.

Example 1

A cellulose acetate used herein was a product of Daicel Corporation under the trade name of L-50, having a total degree of acetyl substitution of 2.43 and a viscosity at 6% of 110 mPa·s. One part by weight of the cellulose acetate was combined with 5.1 parts by weight of acetic acid and 2.0 parts by weight of water. The resulting mixture was stirred for 3 hours to dissolve the cellulose acetate to thereby give a solution. The solution was combined with 0.13 part by weight of sulfuric acid, and the resulting solution was subjected to hydrolysis while being held at 95° C. In the hydrolysis, water was added to the system in two batches so as to prevent cellulose acetate precipitation during the hydrolysis. Specifically, 0.3 hour into the reaction, 0.67 part by weight of water was added to the system over 5 minutes. After 0.7 hour therefrom, 1.33 parts by weight of water was added to the system over 10 minutes, and the reaction was continued for further 1.5 hours. The hydrolysis was performed for a total time of 2.5 hours. In the hydrolysis, a process from the reaction start to the first water addition is referred to as a "first hydrolysis step (first ripening step)", a process from the first water addition to the second water addition is referred to as a "second hydrolysis step (second ripening step)", and a process from the second water addition to the reaction finish is referred to as a "third hydrolysis step (third ripening step)".

After performing the hydrolysis, the system was cooled down to room temperature (about 25° C.), and the reaction mixture was combined with 15 parts by weight of a precipitation solvent (methanol) to form precipitates.

The precipitates were collected as a wet cake having a solids content of 15 percent by weight. For washing, the precipitates were combined with 8 parts by weight of methanol and then deliquored to a solids content of 15 percent by weight. This procedure was repeated three times. The washed precipitates were further washed and neutralized twice with 8 parts by weight of methanol containing 0.004 percent by weight of potassium acetate, dried, and yielded a cellulose acetate with a low degree of substitution.

The cellulose acetate with a low degree of substitution was formed into a film (50 µm thick) by the procedure as described in the description of the tensile strength and elongation at break.

Properties of the obtained cellulose acetate with a low degree of substitution were measured by the methods described above. The properties are, of the cellulose acetate with a low degree of substitution, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%).

Experimental conditions are shown in Table 1; and measurement results of properties of the prepared cellulose acetate with a low degree of substitution are shown in Table 2. In Table 1, the term "third hydrolysis mixture composition (acetic acid weight percent)" refers to the acetic acid concentration (percent by weight) in the system in the third hydrolysis step. In Table 2, the terms "substitution degree" refers to the "total degree of acetyl substitution"; "standard deviation at C2, C3, and C6" refers to the "standard deviation of degrees of substitution at the 2-, 3-, and 6-positions"; and "polymerization degree" refers to the "weight-average degree of polymerization".

Example 4

A cellulose acetate used herein was a product of Daicel Corporation under the trade name of L-50, having a total degree of acetyl substitution of 2.43 and a viscosity at 6% of 110 mPa·s. One part by weight of the cellulose acetate was combined with 5.1 parts by weight of acetic acid and 2.0 parts by weight of water, and the mixture was stirred for 3 hours to dissolve the cellulose acetate to thereby give a solution. The solution was combined with 0.13 part by weight of sulfuric acid, and the resulting solution was subjected to hydrolysis while being held at 70° C. In the hydrolysis, water was added to the system in two batches so as to prevent cellulose acetate precipitation during the hydrolysis. Specifically, 0.67 part by weight of water was added to the system over 5 minutes one hour later. After 2 hours therefrom, 1.33 parts by weight of water was added to the system over 10 minutes, and the reaction was continued for further 9 hours. The hydrolysis was performed for a total time of 12 hours. In the hydrolysis, a process from the reaction start to the first water addition is referred to as a "first hydrolysis step (first ripening step)", a process from the first water addition to the second water addition is referred to as a "second hydrolysis step (second ripening step)", and a process from the second water addition to the reaction finish is referred to as a "third hydrolysis step (third ripening step)".

After performing the hydrolysis, the system was cooled down to room temperature (about 25° C.), and the reaction mixture was combined with 15 parts by weight of a precipitation solvent as a 1:1 (weight ratio) solvent mixture of acetone and methanol to form precipitates. The precipitates were deliquored into a wet cake having a solids content of 15 percent by weight.

The resulting precipitates were combined with water, stirred for 8 hours, and yielded a 5 percent by weight solution. This was combined with methanol as a poor solvent in an amount four times the weight of the 5 percent by weight solution, held at 10° C. for one hour, and precipitates were collected (precipitation fractionation). The precipitates were deliquored into a wet cake having a solids content of 15 percent by weight.

The resulting precipitates were washed, neutralized, and dried by the procedure of Example 1, and yielded a cellulose acetate with a low degree of substitution.

The cellulose acetate with a low degree of substitution was formed into a film (50 µm thick) by the procedure as described in the description of the tensile strength and elongation at break.

Properties of the obtained cellulose acetate with a low degree of substitution were measured by the methods. The properties are, of the cellulose acetate with a low degree of substitution, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%).

The experimental conditions and the yield are shown in Table 1; and the measurement results of the properties of the obtained cellulose acetate with a low degree of substitution are shown in Table 2. In Table 1, the term "third hydrolysis mixture composition (acetic acid weight percent)" refers to the acetic acid concentration (percent by weight) in the system in the third hydrolysis step. In the precipitation fractionation in Table 1, the term "poor solvent weight (part by weight)" refers to a value per 1 part by weight of the 5 percent by weight solution prepared by adding water to the precipitates.

Reference Example 1

A cellulose acetate used herein was a product of Daicel Corporation under the trade name of L-50, having a total degree of acetyl substitution of 2.43 and a viscosity at 6% of 110 mPa·s. One part by weight of the cellulose acetate was combined with 5.1 parts by weight of acetic acid and 2.0 parts by weight of water, and the mixture was stirred for 3 hours to dissolve the cellulose acetate to thereby give a solution. The solution was combined with 0.13 part by weight of sulfuric acid, and the resulting solution was subjected to hydrolysis while being held at 70° C. In the hydrolysis, water was added to the system in two batches so as to prevent cellulose acetate precipitation during the hydrolysis. Specifically, 0.67 part by weight of water was added to the system over 5 minutes one hour later. After 3 hours therefrom, 1.33 parts by weight of water was added to the system over 10 minutes, and the reaction was continued for further 13 hours. The hydrolysis was performed for a total time of 17 hours. In the hydrolysis, a process from the reaction start to the first water addition is referred to as a "first hydrolysis step (first ripening step)", a process from the first water addition to the second water addition is referred to as a "second hydrolysis step (second ripening step)", and a process from the second water addition to the reaction finish is referred to as a "third hydrolysis step (third ripening step)".

After performing the hydrolysis, the system was cooled down to room temperature (about 25° C.), and the reaction mixture was combined with 15 parts by weight of a precipitation solvent as a 1:2 (weight ratio) solvent mixture of methanol and isopropyl alcohol to form precipitates. The precipitates were deliquored into a wet cake having a solids content of 15 percent by weight.

The resulting precipitates were combined with a solvent mixture of acetone and water (having an acetone concentration of 15 percent by weight) in an amount of 15 parts by weight per 1 part by weight of the solids content of the precipitates, stirred at 20° C. for 8 hours, and from which a dense phase was removed by centrifugal separation. A dilute phase was combined with acetone (precipitation solvent), and from which precipitates (solid) were collected (dissolution fractionation). The precipitates were deliquored into a wet cake having a solids content of 15 percent by weight.

The resulting precipitates were washed, neutralized, and dried by the procedure of Example 1, and yielded a cellulose acetate with a low degree of substitution.

The cellulose acetate with a low degree of substitution was formed into a film (50 μm thick) by the procedure as described in the description of the tensile strength and elongation at break.

Properties of the obtained cellulose acetate with a low degree of substitution were measured by the methods. The properties are, of the cellulose acetate with a low degree of substitution, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%).

The experimental conditions and the yield are shown in Table 1; and the measurement results of the properties of the obtained cellulose acetate with a low degree of substitution are shown in Table 2. In Table 1, the term "third hydrolysis mixture composition (acetic acid weight percent)" refers to the acetic acid concentration (percent by weight) in the system in the third hydrolysis step. In the dissolution fractionation in Table 1, the term "solvent" refers to the type of an organic solvent mixed with water; and the term "concentration" refers to the concentration of the organic solvent upon preparation of the mixture of the organic solvent and water.

Example 8

A cellulose acetate used herein was a product of Daicel Corporation under the trade name of L-50, having a total degree of acetyl substitution of 2.43 and a viscosity at 6% of 110 mPa·s. One part by weight of the cellulose acetate was combined with 5.1 parts by weight of acetic acid and 2.0 parts by weight of water, and the mixture was stirred for 3 hours to dissolve the cellulose acetate to thereby give a solution. The solution was combined with 0.13 part by weight of sulfuric acid, and the resulting solution was subjected to hydrolysis while being held at 40° C. In the hydrolysis, water was added to the system in two batches so as to prevent cellulose acetate precipitation during the hydrolysis. Specifically, 0.67 part by weight of water was added to the system over 5 minutes 14 hours later. After 34 hours therefrom, 1.33 parts by weight of water was added to the system over 10 minutes, and the reaction was continued for further 107 hours. The hydrolysis was performed for a total time of 155 hours. In the hydrolysis, a process from the reaction start to the first water addition is referred to as a "first hydrolysis step (first ripening step)", a process from the first water addition to the second water addition is referred to as a "second hydrolysis step (second ripening step)", and a process from the second water addition to the reaction finish is referred to as a "third hydrolysis step (third ripening step)".

After performing the hydrolysis, the system was cooled down to room temperature (about 25° C.), and the reaction mixture was combined with 15 parts by weight of a precipitation solvent as a 1:1 (weight ratio) solvent mixture of acetone and methanol to form precipitates. The precipitates were deliquored into a wet cake having a solids content of 15%.

The resulting precipitates were combined with water, stirred for 8 hours, and yielded a 5 percent by weight solution. This was combined with methanol as a poor solvent in an amount four times the weight of the 5 percent by weight solution, held at 10° C. for one hour, and from which precipitates were collected (precipitation fractionation). The precipitates were deliquored into a wet cake having a solids content of 15 percent by weight.

The resulting precipitates were combined with a solvent mixture of acetone and water having an acetone concentration of 15 percent by weight in an amount of 15 parts by weight per one part by weight of the solids content of the precipitates, stirred at 20° C. for 8 hours, and from which a dense phase was removed by centrifugal separation. A dilute phase was combined with acetone (precipitation solvent), and from which precipitates (solid) were collected (dissolution fractionation). The precipitates were deliquored into a wet cake having a solids content of 15 percent by weight.

The resulting precipitates were washed, neutralized, and dried by the procedure of Example 1, and yielded a cellulose acetate with a low degree of substitution.

The cellulose acetate with a low degree of substitution was formed into a film (50 μm thick) by the procedure as described in the description of the tensile strength and elongation at break.

Properties of the obtained cellulose acetate with a low degree of substitution were measured by the methods. The properties are, of the cellulose acetate with a low degree of substitution, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%).

The experimental conditions and the yield are shown in Table 1, and the measurement results of the properties of the obtained cellulose acetate with a low degree of substitution are shown in Table 2. In Table 1, the term "third hydrolysis mixture composition (acetic acid weight percent)" refers to the acetic acid concentration (percent by weight) in the system in the third hydrolysis step. In the precipitation fractionation in Table 1, the term "poor solvent weight (part by weight)" refers to a value per 1 part by weight of the 5 percent by weight solution prepared by adding water to the precipitates. In the dissolution fractionation in Table 1, the term "solvent" refers to the type of an organic solvent mixed with water; and the term "concentration" refers to the concentration of the organic solvent upon preparation of the mixture of the organic solvent and water.

Examples 2, 3, 5, and 9 to 28, Reference Example 2, and Comparative Examples 1, 3, and 4

A series of cellulose acetates with a low degree of substitution was prepared by performing reaction and precipitation under conditions given in Table 1 by the procedure of Example 1 when precipitation fractionation and dissolution fractionation were not performed; and by the procedure of Example 4 or 8 or Reference Example 1 when precipitation fractionation and/or dissolution fractionation was performed. From these, films (50 µm thick) were prepared by the procedure as described in the description of the tensile strength and elongation at break. Experimental conditions are shown in Table 1, and the measurement results of the properties of the obtained cellulose acetate with a low degree of substitution are shown in Table 2.

Comparative Example 2

A cellulose acetate with a low degree of substitution was prepared by the method described in Japanese Unexamined Patent Application Publication No. H04-261401. The resulting cellulose acetate was formed into a film (50 µm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%). The yield is shown in Table 1, and the measurement results of the properties are shown in Table 2.

Comparative Example 5

The cellulose acetate obtained in Example 19 as a low-viscosity cellulose acetate and the cellulose acetate obtained in Reference Example 2 Example 7 as a high-viscosity cellulose acetate were mixed in proportions (weight ratio) of 50:50. The mixture of the two cellulose acetates was formed into a film (50 µm thick) by the procedure as described in the description of the tensile strength and elongation at break. Properties of the resulting cellulose acetate (mixture) were measured by the methods described above. The properties are, of the cellulose acetate, the total degree of acetyl substitution, standard deviation of degrees of substitution at the 2-, 3-, and 6-positions, viscosity at 6% (mPas), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%). The measurement results of the properties are shown in Table 2.

Comparative Example 6

A cellulose acetate with a low degree of substitution was prepared according to a method described in Example 1 of Japanese Unexamined Patent Application Publication (Translation of PCT Application) No. H05-500684 using methanol as a reaction solvent. The cellulose acetate was formed into a film (50 µm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%). The yield is shown in Table 1, and the measurement results of the properties are shown in Table 2.

Comparative Example 7

A cellulose acetate with a low degree of substitution was prepared according to a method described in Example 6 of Japanese Unexamined Patent Application Publication (Translation of PCT Application) No. H05-500684 using methanol as a reaction solvent. The cellulose acetate was formed into a film (50 µm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%). The yield is shown in Table 1, and the measurement results of the properties are shown in Table 2.

Comparative Example 8

A cellulose acetate with a low degree of substitution was prepared according to a method described in Example 1 of Japanese Unexamined Patent Application Publication (Translation of PCT Application) No. H05-501129 using methanol as a reaction solvent. The cellulose acetate was formed into a film (50 µm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm$^2$) and elongation at break (%). The yield is shown in Table 1, and the measurement results of the properties are shown in Table 2.

Comparative Example 9

A cellulose acetate with a low degree of substitution was prepared according to a method described in Example 1 of Japanese Examined Patent Application Publication No. H01-13481. The cellulose acetate was formed into a film (50 µm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm²) and elongation at break (%). The yield is shown in Table 1, and the measurement results of the properties are shown in Table 2.

Comparative Example 10

A cellulose acetate with a low degree of substitution was prepared according to a method described in Example 1 of Japanese Unexamined Patent Application Publication No. H04-261401, except for shortening the hydrolysis time from 20.7 hours to 11.5 hours. The cellulose acetate was formed into a film (50 μm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm²) and elongation at break (%). The yield is shown in Table 1, and the measurement results of the properties are shown in Table 2.

Comparative Example 11

A cellulose acetate with a low degree of substitution was prepared by the procedure of Comparative Example 8, except for shortening the contact time from 12 hours to 11 hours. The cellulose acetate was formed into a film (50 μm thick) by the procedure as described in the description of the tensile strength and elongation at break. Properties of the obtained cellulose acetate were measured by the methods described above. The properties are, of the cellulose acetate, the total degree of acetyl substitution, standard deviation of degrees of substitution at the 2-, 3-, and 6-positions, viscosity at 6% (mPa·s), weight-average degree of polymerization (DPw), polydispersity (Mw/Mn), half height width of intermolecular substitution degree distribution (measured value), and compositional distribution index (CDI); and, of the film, the tensile strength (kgf/cm²) and elongation at break (%). The yield is shown in Table 1, and the measurement results of the properties are shown in Table 2.

Preparation of Fibers having Fineness of 16.7 d

Each of the cellulose acetates with a low degree of substitution obtained in the examples; comparative examples, and reference examples was formed into a fiber having a fineness of 16.7 d by a method described in Example 1 in Japanese Examined Patent Application Publication No. H01-13481. Specifically, the cellulose acetate with a low degree of substitution sample was dissolved in water to give a dope having a concentration of 15 percent by weight. The dope was dry-spun and yielded a fiber (yarn) having a filament denier of 16.7. The dry spinning was performed under conditions at a taking-up rate of 100 m/min., a drying temperature of 400° C., and a discharge rate of 2.22 g/min., using a spinneret having 12 holes with a hole diameter of 0.5 mm. The obtained fiber was examined to measure the breaking strength (g/d) and elongation (%) at a temperature of 20° C.±2° C. and relative humidity of 65%±2% in conformity with JIS L 1015. The results are shown in Table 2. In Table 2, a sample that could not be spun mainly because of dope clogging in the spinneret is indicated as "not spinnable".

Preparation of Fibers Having Fineness of 9 d (380° C.)

Each of the cellulose acetates with a low degree of substitution obtained in the examples, comparative examples, and reference examples was formed into a fiber having a fineness of 9 d (10 dtex) by a method described in Example 2 of Japanese Unexamined Patent Application Publication No. H07-268724. Specifically, 900 g of the cellulose acetate with a low degree of substitution sample was dissolved in 1.9 L of hot water at 95° C. This was filtrated and degassed, and the resulting solution was heated at 125° C., discharged through a spinning pump from a spinneret having 20 holes with a hole diameter of 0.15 mm, and taken-up at a rate of 305 m/min. while being dried at 380° C. Thus, a fiber (yarn) having a filament denier of 9 d (10 dtex) was prepared while adjusting the discharge amount from the spinneret. The obtained fiber was examined to measure the breaking strength (g/d) and elongation (%) at a temperature of 20° C.±2° C. and relative humidity of 65%±2% in conformity with JIS L 1015. The results are shown in Table 2. In Table 2, a sample that could not be spun mainly because of dope clogging in the spinneret is indicated as "not spinnable".

Preparation of Fibers Having Fineness of 9 d (120° C.)

An aliquot (900 g) of each of the cellulose acetates with a low degree of substitution obtained in the examples. comparative examples, and reference examples as a sample was dissolved in 9100 g of water and yielded a dope having a concentration of 9 percent by weight. This was filtrated, concentrated, and thereby yielded a dope having a concentration of 31 percent by weight. This was heated at 95° C., deaerated, discharged through a spinning pump from a spinneret having 18 holes with a hole diameter of 0.1 mm at a rate of 4 ml/min., taken-up at a taking-up rate as adjusted in the range of from about 10 to about 15 m while being dried at 120° C., and yielded a fiber (yarn) having a filament denier of 9 d. The obtained fiber was examined to measure the breaking strength (g/d) and elongation (%) at a temperature of 20° C.±2° C. and relative humidity of 65%±2% in conformity with JIS L 1015. The results are shown in Table 2. In Table 2, a sample that could not be spun mainly because of dope clogging in the spinneret is indicated as "not spinnable".

TABLE 1

| | Substitution degree | Reaction temperature (° C.) | Reaction time (hr.) | | | | Sulfuric acid amount (part by weight per 1 part by weight of cellulose acetate) | Third hydrolysis mixture composition (acetic acid weight percent) | Precipitation solvent |
| | | | First hydrolysis | Second hydrolysis | Third hydrolysis | Total | | | |
| --- | --- | --- | --- | --- | --- | --- | --- | --- | --- |
| Ex. 1 | 2.43 | 95 | 0.3 | 0.7 | 1.5 | 2.5 | 0.13 | 56 | methanol |
| Ex. 2 | 2.43 | 100 | 0.25 | 0.5 | 1.25 | 2 | 0.13 | 56 | methanol |
| Ex. 3 | 2.43 | 105 | 0.2 | 0.3 | 1 | 1.5 | 0.13 | 56 | methanol |
| Ex. 4 | 2.43 | 70 | 1 | 2 | 9 | 12 | 0.13 | 56 | 1:1 acetone- |

TABLE 1-continued

| | | | | | | | | | |
|---|---|---|---|---|---|---|---|---|---|
| Ex. 5 | 2.43 | 70 | 1 | 2 | 6 | 9 | 0.13 | 56 | 1:2 acetone-methanol |
| Ref. 1 | 2.43 | 70 | 1 | 3 | 13 | 17 | 0.13 | 50 | 1:2 methanol-isopropyl alcohol |
| Ref. 2 | 2.43 | 70 | 1 | 2 | 3 | 7 | 0.13 | 56 | 1:9 acetone-methanol |
| Ex. 8 | 2.43 | 40 | 14 | 34 | 107 | 155 | 0.038 | 59 | 1:1 acetone-methanol |
| Ex. 9 | 2.43 | 40 | 8 | 16 | 52 | 76 | 0.13 | 56 | 1:1 acetone-methanol |
| Ex. 10 | 2.43 | 70 | 3 | 4 | 14 | 21 | 0.05 | 56 | 1:1 acetone-methanol |
| Ex. 11 | 2.43 | 40 | 14 | 34 | 107 | 155 | 0.038 | 59 | methanol |
| Ex. 12 | 2.43 | 40 | 8 | 16 | 52 | 76 | 0.13 | 56 | methanol |
| Ex. 13 | 2.43 | 70 | 3 | 4 | 14 | 21 | 0.05 | 56 | acetone |
| Ex. 14 | 2.43 | 40 | 14 | 34 | 107 | 155 | 0.038 | 59 | methanol |
| Com. Ex. 1 | 2.43 | 40 | 8 | 16 | 52 | 76 | 0.13 | 56 | methanol |
| Com. Ex. 2 | following Example 1 of Japanese Unexamined Patent Application Publication No. H04-261401 | | | | | | | | |
| Ex. 15 | 2.43 | 70 | 3 | 5 | 2 | 10 | 0.13 | 56 | acetone |
| Ex. 16 | 2.43 | 70 | 3 | 5 | 2 | 10 | 0.13 | 56 | acetone |
| Ex. 17 | 2.43 | 70 | 3 | 5 | 2 | 10 | 0.13 | 56 | acetone |
| Com. Ex. 3 | 2.43 | 70 | 3 | 5 | 2 | 10 | 0.13 | 56 | acetone |
| Ex. 18 | 2.43 | 60 | 3 | 7 | 14 | 24 | 0.13 | 56 | 1:1 acetone-methanol |
| Ex. 19 | 2.43 | 80 | 0.5 | 1.5 | 3 | 5 | 0.13 | 56 | 1:1 acetone-methanol |
| Ex. 20 | 2.43 | 40 | 14 | 10 | 56 | 80 | 0.13 | 56 | 1:1 acetone-methanol |
| Ex. 21 | 2.43 | 70 | 1 | 2 | 8 | 11 | 0.13 | 56 | 1:1 acetone-methanol |
| Ex. 22 | 2.43 | 70 | 1 | 2 | 8 | 11 | 0.13 | 56 | 1:1 acetone-methanol |
| Ex. 23 | 2.43 | 40 | 14 | 10 | 46 | 70 | 0.13 | 35 | 1:1 acetone-methanol |
| Com. Ex. 4 | 2.43 | 40 | 14 | 10 | 46 | 70 | 0.13 | 35 | 1:1 acetone-methanol |
| Ex. 24 | 2.43 | 40 | 14 | 24 | 100 | 138 | 0.05 | 56 | 1:1 acetone-methanol |
| Ex. 25 | 2.43 | 80 | 0.5 | 1.5 | 5 | 7 | 0.13 | 56 | 1:2 methanol-isopropyl alcohol |
| Ex. 26 | 2.43 | 85 | 0.5 | 1.5 | 2.5 | 4.5 | 0.20 | 56 | 1:2 methanol-isopropyl alcohol |
| Com. Ex. 5 | 50:50 mixture of Example 19 as low-viscosity cellulose acetate and Example 7 as high-viscosity cellulose acetate | | | | | | | | |
| Com. Ex. 6 | | | | | | | | | |
| Com. Ex. 7 | following Example 6 of Japanese Unexamined Patent Application Publication (Translation of PCT Application) No. H05-500684 | | | | | | | | |
| Com. Ex. 8 | following Example 1 of Japanese Unexamined Patent Application Publication (Translation of PCT Application) No. H05-501129 | | | | | | | | |
| Com. Ex. 9 | following Example 1 of Japanese Examined Patent Application Publication No. H01-13481 | | | | | | | | |
| Com. Ex. 10 | following Example 1 of Japanese Unexamined Patent Application Publication No. H04-261401, except for shortening the hydrolysis time from 20.7 hrs. to 11.5 hrs. | | | | | | | | |
| Ex. 27 | 2.43 | 70 | 1 | 2 | 4.5 | 7.5 | 0.13 | 56 | 1:2 acetone-methanol |
| Ex. 28 | 2.43 | 40 | 14 | 34 | 95 | 143 | 0.038 | 59 | methanol |
| Com. Ex. 11 | following Example 1 of Japanese Unexamined Patent Application Publication (Translation of PCT Application) No. H05-501129, except for shortening the contact time from 12 hrs. to 11 hrs. | | | | | | | | |

| | Precipitation fractionation | | | Dissolution fractionation | | | |
|---|---|---|---|---|---|---|---|
| | Poor solvent | Weight (part by weight) | Temperature (° C.) | Solvent | Concentration (weight percent) | Temperature (° C.) | Yield |
| Ex. 1 | — | — | — | — | — | — | 93 |
| Ex. 2 | — | — | — | — | — | — | 94 |
| Ex. 3 | — | — | — | — | — | — | 91 |
| Ex. 4 | methanol | 4 | 10 | — | — | — | 90 |
| Ex. 5 | methanol | 4 | 10 | — | — | — | 95 |
| Ref. 1 | — | — | — | acetone | 15 | 20 | 90 |
| Ref. 2 | — | — | — | acetone | 15 | 20 | 87 |

TABLE 1-continued

| | | | | | | | |
|---|---|---|---|---|---|---|---|
| Ex. 8 | methanol | 4 | 10 | acetone | 15 | 20 | 92 |
| Ex. 9 | methanol | 4 | 10 | acetone | 15 | 20 | 93 |
| Ex. 10 | methanol | 4 | 10 | acetone | 15 | 20 | 90 |
| Ex. 11 | methanol | 4 | 10 | acetone | 20 | 40 | 83 |
| Ex. 12 | methanol | 4 | 10 | acetone | 20 | 40 | 82 |
| Ex. 13 | methanol | 4 | 10 | acetone | 20 | 40 | 83 |
| Ex. 14 | — | — | — | acetone | 20 | 40 | 93 |
| Com. Ex. 1 | — | — | — | — | — | — | 90 |
| Com. Ex. 2 | following Example 1 of Japanese Unexamined Patent Application Publication No. H04-261401 | | | | | | 94 |
| Ex. 15 | methanol | 4 | 10 | acetone | 20 | 40 | 83 |
| Ex. 16 | acetone | 4 | 10 | ethanol | 30 | 50 | 84 |
| Ex. 17 | — | — | — | acetone | 20 | 40 | 81 |
| Com. Ex. 3 | — | — | — | — | — | — | 90 |
| Ex. 18 | methanol | 4 | 10 | — | — | — | 90 |
| Ex. 19 | methanol | 4 | 10 | — | — | — | 92 |
| Ex. 20 | — | — | — | acetone | 20 | 40 | 92 |
| Ex. 21 | methanol | 3 | 10 | acetone | 20 | 40 | 83 |
| Ex. 22 | methanol | 3 | 10 | acetone | 20 | 40 | 90 |
| Ex. 23 | methanol | 4 | 10 | acetone | 30 | 40 | 84 |
| Com. Ex. 4 | — | — | — | — | — | — | 93 |
| Ex. 24 | methanol | 4 | 10 | — | — | — | 93 |
| Ex. 25 | methanol | 4 | 10 | — | — | — | 90 |
| Ex. 26 | — | — | — | acetone | 20 | 40 | 93 |
| Com. Ex. 5 | 50:50 mixture of Example 19 as low-viscosity cellulose acetate and Example 7 as high-viscosity cellulose acetate | | | | | | |
| Com. Ex. 6 | | | | | | | 63 |
| Com. Ex. 7 | following Example 6 of Japanese Unexamined Patent Application Publication (Translation of PCT Application) No. H05-500684 | | | | | | 65 |
| Com. Ex. 8 | following Example 1 of Japanese Unexamined Patent Application Publication (Translation of PCT Application) No. H05-501129 | | | | | | 79 |
| Com. Ex. 9 | following Example 1 of Japanese Examined Patent Application Publication No. H01-13481 | | | | | | 81 |
| Com. Ex.10 | following Example 1 of Japanese Unexamined Patent Application Publication No. H04-261401, except for shortening the hydrolysis time from 20.7 hrs. to 11.5 hrs. | | | | | | 97 |
| Ex. 27 | — | — | — | acetone | 15 | 20 | 95 |
| Ex. 28 | — | — | — | acetone | 20 | 40 | 92 |
| Com. Ex. 11 | following Example 1 of Japanese Unexamined Patent Application Publication (Translation of PCT Application) No. H05-501129, except for shortening the contact time from 12 hrs. to 11 hrs. | | | | | | 80 |

TABLE 2

| | Product | | | | | | |
|---|---|---|---|---|---|---|---|
| | Substitution degree | Standard deviation at C2, C3, and C6 | Viscosity at 6% (mPa·s) | Polymerization degree | Polydispersity | Half height width of intermolecular DS distribution | CDI |
| Ex. 1 | 0.88 | 0.045 | 23 | 170 | 2.0 | 0.21 | 1.47 |
| Ex. 2 | 0.85 | 0.051 | 18 | 160 | 2.0 | 0.23 | 1.55 |
| Ex. 3 | 0.85 | 0.060 | 12 | 160 | 2.0 | 0.22 | 1.52 |
| Ex. 4 | 0.63 | 0.066 | 16 | 120 | 1.9 | 0.236 | 1.56 |
| Ex. 5 | 0.87 | 0.030 | 103 | 180 | 1.9 | 0.198 | 1.43 |
| Ref. 1 | 0.38 | 0.075 | 5.2 | 70 | 1.8 | 0.389 | 2.40 |
| Ref. 2 | 1.21 | 0.029 | 148 | 210 | 2.3 | 0.399 | 2.89 |
| Ex. 8 | 0.73 | 0.037 | 212 | 180 | 1.8 | 0.190 | 1.46 |
| Ex. 9 | 0.75 | 0.037 | 160 | 180 | 1.8 | 0.185 | 1.41 |
| Ex. 10 | 0.75 | 0.060 | 40 | 160 | 2.4 | 0.211 | 1.51 |
| Ex. 11 | 0.73 | 0.037 | 210 | 180 | 1.9 | 0.179 | 1.37 |
| Ex. 12 | 0.75 | 0.037 | 160 | 180 | 2.0 | 0.182 | 1.38 |
| Ex. 13 | 0.75 | 0.060 | 45 | 160 | 2.3 | 0.198 | 1.42 |
| Ex. 14 | 0.73 | 0.040 | 226 | 180 | 2.4 | 0.303 | 2.32 |
| Com. Ex. 1 | 0.75 | 0.042 | 185 | 180 | 2.4 | 0.405 | 3.08 |
| Com. Ex. 2 | 0.61 | 0.067 | 153 | 160 | 3.4 | 0.341 | 3.11 |
| Ex. 15 | 0.76 | 0.065 | 39 | 160 | 1.8 | 0.159 | 1.13 |
| Ex. 16 | 0.74 | 0.068 | 39 | 160 | 1.8 | 0.162 | 1.17 |
| Ex. 17 | 0.76 | 0.065 | 45 | 160 | 2.0 | 0.356 | 2.54 |
| Com. Ex. 3 | 0.76 | 0.069 | 53 | 180 | 3.4 | 0.451 | 3.41 |

TABLE 2-continued

| | | | | | | | |
|---|---|---|---|---|---|---|---|
| Ex. 18 | 0.65 | 0.075 | 45 | 150 | 2.0 | 0.235 | 1.71 |
| Ex. 19 | 0.80 | 0.005 | 12 | 180 | 1.8 | 0.213 | 1.58 |
| Ex. 20 | 0.65 | 0.083 | 94 | 150 | 2.3 | 0.334 | 2.43 |
| Ex. 21 | 0.76 | 0.015 | 40 | 150 | 1.4 | 0.162 | 1.12 |
| Ex. 22 | 0.76 | 0.027 | 45 | 160 | 1.9 | 0.198 | 1.41 |
| Ex. 23 | 0.77 | 0.073 | 186 | 170 | 2.3 | 0.222 | 1.62 |
| Com. Ex. 4 | 0.85 | 0.160 | 243 | 200 | 3.4 | 0.397 | 3.05 |
| Ex. 24 | 0.87 | 0.031 | 448 | 420 | 2.3 | 0.167 | 1.85 |
| Ex. 25 | 0.55 | 0.068 | 8.0 | 80 | 2.0 | 0.340 | 1.93 |
| Ex. 26 | 0.54 | 0.073 | 6.5 | 40 | 1.9 | 0.597 | 2.41 |
| Com. Ex. 5 | 1.01 | 0.021 | 80 | 195 | 4.1 | 0.634 | 4.60 |
| Com. Ex. 6 | 0.38 | 0.065 | 80 | 160 | 3.8 | 0.35 | 3.26 |
| Com. Ex. 7 | 0.49 | 0.150 | 131 | 160 | 4.5 | 0.41 | 3.44 |
| Com. Ex. 8 | 0.75 | 0.165 | 156 | 190 | 4.3 | 0.45 | 3.51 |
| Com. Ex. 9 | 0.49 | 0.030 | 21 | 89 | 2.1 | 0.51 | 3.18 |
| Com. Ex. 10 | 1.02 | 0.030 | 198 | 190 | 2.4 | 0.44 | 3.14 |
| Ex. 27 | 1.02 | 0.030 | 195 | 210 | 2.0 | 0.37 | 2.80 |
| Ex. 28 | 0.80 | 0.040 | 241 | 190 | 2.4 | 0.28 | 2.14 |
| Com. Ex. 11 | 0.80 | 0.163 | 160 | 195 | 4.2 | 0.40 | 3.06 |

| | Film properties (50 μm thick) | | Yarn properties (16.7 d) | | Yarn properties (9 d) (380° C.) | | Yarn Properties (9 d) (120° C.) | |
|---|---|---|---|---|---|---|---|---|
| | Tensile strength (kgf/cm²) | Elongation at break (%) | Breaking strength (g/d) | Elongation (%) | Breaking strength (g/d) | Elongation (%) | Breaking strength (g/d) | Elongation (%) |
| Ex. 1 | 910 | 9.7 | 2.4 | 13.1 | 2.0 | 27.9 | 2.3 | 30.6 |
| Ex. 2 | 876 | 8.5 | 2.4 | 12.8 | 2.0 | 28.2 | 2.3 | 30.8 |
| Ex. 3 | 890 | 8.5 | 2.4 | 12.7 | 2.0 | 28.2 | 2.3 | 30.8 |
| Ex. 4 | 853 | 9.8 | 2.4 | 12.0 | 1.9 | 26.8 | 2.2 | 29.7 |
| Ex. 5 | 882 | 9.1 | 2.4 | 13.2 | 2.0 | 27.8 | 2.3 | 30.9 |
| Ref. 1 | 367 | 3.1 | not spinnable | | not spinnable | | not spinnable | |
| Ref. 2 | 345 | 3.0 | not spinnable | | not spinnable | | not spinnable | |
| Ex. 8 | 855 | 9.0 | 2.4 | 13.1 | 2.0 | 28.2 | 2.3 | 30.6 |
| Ex. 9 | 865 | 8.8 | 2.4 | 13.2 | 2.0 | 28.0 | 2.3 | 30.7 |
| Ex. 10 | 865 | 8.8 | 2.4 | 13.1 | 2.0 | 27.8 | 2.3 | 30.5 |
| Ex. 11 | 859 | 8.9 | 2.4 | 13.1 | 2.0 | 27.7 | 2.3 | 30.9 |
| Ex. 12 | 890 | 9.5 | 2.4 | 12.9 | 2.0 | 28.3 | 2.3 | 30.8 |
| Ex. 13 | 880 | 9.2 | 2.4 | 13.2 | 2.0 | 27.7 | 2.3 | 30.7 |
| Ex. 14 | 395 | 3.2 | 2.3 | 11.7 | 1.8 | 25.9 | 2.0 | 28.6 |
| Com. Ex. 1 | 365 | 2.9 | 1.9 | 7.7 | 1.4 | 16.7 | not spinnable | |
| Com. Ex. 2 | 385 | 3.8 | 1.8 | 8.2 | 1.3 | 16.0 | not spinnable | |
| Ex. 15 | 899 | 9.5 | 2.5 | 12.9 | 2.0 | 30.1 | 2.3 | 33.0 |
| Ex. 16 | 915 | 9.4 | 2.5 | 13.3 | 2.0 | 30.1 | 2.3 | 33.1 |
| Ex. 17 | 417 | 3.6 | 2.3 | 11.9 | 1.8 | 25.7 | 2.0 | 28.4 |
| Com. Ex. 3 | 391 | 2.6 | 1.8 | 5.8 | 1.3 | 13.2 | not spinnable | |
| Ex. 18 | 788 | 8.2 | 2.4 | 12.2 | 1.9 | 27.1 | 2.2 | 29.6 |
| Ex. 19 | 883 | 9.1 | 2.4 | 12.0 | 1.9 | 27.3 | 2.2 | 29.8 |
| Ex. 20 | 363 | 2.8 | 2.3 | 12.2 | 1.9 | 26.1 | 2.2 | 28.6 |
| Ex. 21 | 878 | 9.4 | 2.5 | 13.0 | 2.0 | 29.9 | 2.3 | 33.1 |
| Ex. 22 | 859 | 9.0 | 2.5 | 13.1 | 2.0 | 29.7 | 2.3 | 33.0 |
| Ex. 23 | 820 | 8.2 | 2.5 | 12.7 | 2.0 | 30.3 | 2.3 | 32.8 |
| Com. Ex. 4 | 400 | 3.4 | 2.0 | 8.8 | 1.4 | 18.1 | not spinnable | |
| Ex. 24 | 710 | 7.0 | 2.5 | 13.1 | 2.0 | 30.0 | 2.3 | 33.2 |
| Ex. 25 | 604 | 6.3 | 2.5 | 13.0 | 2.0 | 29.9 | 2.3 | 33.1 |
| Ex. 26 | 358 | 3.4 | 2.3 | 12.2 | 1.8 | 26.3 | 2.0 | 28.5 |
| Com. Ex. 5 | 423 | 3.5 | 1.8 | 5.0 | 1.4 | 12.1 | not spinnable | |
| Com. Ex. 6 | 321 | 2.4 | 1.9 | 8.1 | 1.4 | 16.7 | not spinnable | |
| Com. Ex. 7 | 297 | 2.6 | 1.9 | 7.1 | 1.4 | 14.9 | not spinnable | |
| Com. Ex. 8 | 286 | 1.9 | 1.9 | 7.3 | 1.4 | 14.7 | not spinnable | |
| Com. Ex. 9 | 279 | 2.2 | 1.9 | 7.2 | 1.4 | 15.3 | not spinnable | |

TABLE 2-continued

| | | | | | | | |
|---|---|---|---|---|---|---|---|
| Com. Ex. 10 | 279 | 2.2 | 2.0 | 9.2 | 1.4 | 17.8 | not spinnable |
| Ex. 27 | 360 | 4.0 | 2.2 | 11.2 | 1.7 | 25.2 | 2.0   28.6 |
| Ex. 28 | 401 | 3.1 | 2.4 | 11.7 | 1.8 | 26.0 | 2.0   28.8 |
| Com. Ex. 11 | 284 | 2.0 | 1.9 | 6.7 | 1.3 | 14.5 | not spinnable |

The relationships between properties of the films (50 μm thick) formed from the cellulose acetates obtained in the examples, comparative examples, and reference examples were plotted. Specifically, FIG. 1 depicts a graph illustrating how the tensile strength (kgf/cm$^2$) varies depending on the CDI; and FIG. 2 depicts a graph illustrating how the elongation at break (%) varies depending on the CDI. In addition, the relationships between properties of the fibers (yarns) having a fineness of 16.7 d and between properties of the fibers (yarns) having a fineness of 9 d (380° C.) prepared from the cellulose acetates obtained in the examples and comparative examples were plotted. Specifically, FIG. 3 depicts a graph illustrating how the breaking strength (g/d) varies depending on the CDI; and FIG. 4 depicts a graph illustrating how the elongation (%) varies depending on the CDI. In FIG. 3, data indicated with an open triangle (Δ) are data of the fibers (yarns) having a fineness of 16.7 d; and data indicated with a filled triangle (▲) are data of the fibers (yarns) having a fineness of 9 d (380° C.). In FIG. 4, data indicated with an open square (□) are data of the fibers (yarns) having a fineness of 16.7 d; and data indicated with a filled square (■) are data of the fibers (yarns) having a fineness of 9 d (380° C.).

As demonstrated by the results in Table 2 and FIGS. 3 and 4, the fibers (yarns) prepared from the cellulose acetates with a low degree of substitution obtained in the examples each have a compositional distribution index (CDI) of 3.0 or less and have a high breaking strength and a high elongation in spite of having a low degree of substitution. As demonstrated by the results in Table 2 and FIGS. 1 and 2, the films prepared particularly from the cellulose acetates with a low degree of substitution having a compositional distribution index (CDI) of 2.0 or less have a high tensile strength and a high elongation at break in spite of having a low degree of substitution.

Water Solubility Evaluation

In this evaluation, there were prepared the cellulose acetate obtained in Example 19; the cellulose acetate obtained in Example 28 by the same synthesis method as in Example 14, except for shortening the third hydrolysis time from 107 hours to 95 hours; and the cellulose acetate obtained in Comparative Example 11 by the same synthesis method as in Comparative Example 8, except for shortening the contact time from 12 hours to 11 hours. These cellulose acetates were each dissolved in ion-exchanged water and each yielded 5 percent by weight and 10 percent by weight aqueous solutions. The prepared cellulose acetate aqueous solutions were examined to measure the light transmittance (at a wavelength of 500 nm) using a UV-Vis spectrophotometer (trade name UV-1700, supplied by Shimadzu Corporation). The results are shown in Table 3. Table 3 demonstrates that the sample cellulose acetates have a higher light transmittance and offer better water solubility with a decreasing compositional distribution index (CDI).

TABLE 3

| | Total degree of acetyl substitution | CDI | Light transmittance (%) (λ = 500 nm) | |
|---|---|---|---|---|
| | | | 5 wt. % Aqueous solution | 10 wt. % Aqueous solution |
| Example 19 | 0.80 | 1.58 | 84 | 72 |
| Example 28 | 0.80 | 2.14 | 71 | 63 |
| Comparative Example 11 | 0.80 | 3.06 | 29 | 11 |

INDUSTRIAL APPLICABILITY

The cellulose acetate according to the present invention is highly soluble in water, has a low degree of substitution, but, when formed into a film or fiber, still has strength/elongation (tensile strength or breaking strength, and elongation at break or elongation) at high levels. The cellulose acetate is thereby usable as water-soluble or hydrophilic polymeric materials typically for tablet binders, tablet coating agents, binders of staple fiber, cosmetic thickeners, cosmetic moisturizers, excipients or fillers, and materials for formed articles.

The invention claimed is:

1. A cellulose acetate having a total degree of acetyl substitution of 0.4 to 1.1 and having a compositional distribution index (CDI) as specified by a formula of greater than 1.0 to 3.0, the formula expressed as follows:

CDI=(Measured value of half height width of chemical composition)/(Theoretical value of half height width of chemical composition)

wherein:
the measured value of half height width of chemical composition is a half height width of chemical composition determined by HPLC analysis of a cellulose acetate propionate prepared by propionylating all residual hydroxy groups of the cellulose acetate (sample); and
the theoretical value of half height width of chemical composition is specified by a formula:

Theoretical value of half height width of chemical composition=2·35482 $\sqrt{3*DPw*(DS/3)*(1-DS/3)}/DPw$   [Math. 1]

where:
DS represents the total degree of acetyl substitution; and
DPw represents a weight-average degree of polymerization determined by a GPC-light scattering method using a cellulose acetate propionate prepared by propionylating all residual hydroxy groups of the cellulose acetate (sample).

2. The cellulose acetate according to claim 1, wherein the cellulose acetate has a CDI of greater than 1.0 to 2.8.

3. The cellulose acetate according to claim 1, wherein the cellulose acetate has a CDI of greater than 1.0 to 2.0.

4. The cellulose acetate according to claim 1, wherein the cellulose acetate has a standard deviation σ of 0.08 or less, where the standard deviation σ is of degrees of acetyl substitution at 2-position, 3-position, and 6-position and is specified by a formula:

$$\sigma^2 = \frac{1}{n-1} \sum_{i=1}^{n} (x_i - \bar{x})^2$$

where:
σ represents the standard deviation;
n is 3;
of $x_i$, $x_1$ represents the degree of substitution at the 2-position, $x_2$ represents the degree of substitution at the 3-position, and $x_3$ represents the degree of substitution at the 6-position; and $\bar{x}$=(Total degree of acetyl substitution)/3.

5. The cellulose acetate according to claim 1, wherein the cellulose acetate has a polydispersity (Mw/Mn) of 1.2 to 2.5, where the polydispersity is a value determined by a GPC-light scattering method using a cellulose acetate propionate prepared by propionylating all residual hydroxy groups of the cellulose acetate (sample).

6. The cellulose acetate according to claim 1, wherein the cellulose acetate has a weight-average degree of polymerization (DPw) of 50 to 800, where the weight-average degree of polymerization is a value determined by a GPC-light scattering method using a cellulose acetate propionate prepared by propionylating all residual hydroxy groups of the cellulose acetate (sample).

7. A method for producing a cellulose acetate as the cellulose acetate according to claim 1, the method comprising
partially hydrolyzing a cellulose acetate at a temperature of higher than 90° C. to give the cellulose acetate having a lower degree of substitution.

8. A formed article formed from the cellulose acetate according to claim 1.

9. A fiber or film formed from the cellulose acetate according to claim 1.

10. The cellulose acetate according to claim 1, wherein the cellulose acetate has a CDI of 1.12 to 3.0.

* * * * *